US012668487B2

(12) United States Patent (10) Patent No.: US 12,668,487 B2
Tetard et al. (45) Date of Patent: Jun. 30, 2026

(54) SOLAR PRODUCTION OF HYDROGEN USING DEFECT ENGINEERED BORON-RICH PHOTOCALYSTS

(71) Applicant: UNIVERSITY OF CENTRAL FLORIDA RESEARCH FOUNDATION, INC., Orlando, FL (US)

(72) Inventors: Laurene Tetard, Orlando, FL (US); Richard Blair, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 1028 days.

(21) Appl. No.: 17/859,533

(22) Filed: Jul. 7, 2022

(65) Prior Publication Data

US 2023/0011182 A1 Jan. 12, 2023

Related U.S. Application Data

(60) Provisional application No. 63/352,793, filed on Jun. 16, 2022, provisional application No. 63/219,333, filed on Jul. 7, 2021.

(51) Int. Cl.
*C01B 3/26* (2006.01)
*B01J 19/12* (2006.01)
(Continued)

(52) U.S. Cl.
CPC .............. *C01B 3/26* (2013.01); *B01J 19/123* (2013.01); *B01J 19/127* (2013.01); *B01J 27/24* (2013.01);
(Continued)

(58) Field of Classification Search
None
See application file for complete search history.

(56) References Cited

U.S. PATENT DOCUMENTS 9,624,154 B2 4/2017 Blair
9,725,395 B2 8/2017 Blair
(Continued)

OTHER PUBLICATIONS

PE2E english translation of CN 114749200 (Year: 2022).*
(Continued)

*Primary Examiner* — Brian W Cohen
*Assistant Examiner* — Nathanael Jason Downes
(74) *Attorney, Agent, or Firm* — Timothy H. Van Dyke; Wolter Van Dyke Davis, PLLC

(57) ABSTRACT

The inventive concepts disclosed relate to the production of green and blue hydrogen from hydrocarbons using visible light (from a laser, lamp or sun) and defect-engineered boron-rich photocatalysts. We demonstrate that the environment of the B atoms in the lattice can be tuned to favor the dehydrogenation of desired hydrocarbons on reaction sites under visible light. In addition to the hydrogen produced in gas form, carbon atoms are captured by the catalyst and form structures of potential higher value for future applications. Further study of the dark carbonaceous product revealed a graphitic aspect of the material. These findings highlight a new functionality of 2D materials for visible light-assisted capture and conversion of hydrocarbons, with great potential for green hydrogen production—i.e, hydrogen produced from renewable energy and without the release of CO or $CO_2$.

13 Claims, 21 Drawing Sheets

(51) Int. Cl.
    *B01J 27/24* (2006.01)
    *B01J 35/39* (2024.01)
    *B01J 35/77* (2024.01)
    *C01B 32/205* (2017.01)

(52) U.S. Cl.
    CPC .............. *B01J 35/39* (2024.01); *B01J 35/77*
    (2024.01); *C01B 32/205* (2017.08); *B01J*
    *2219/0875* (2013.01); *B01J 2219/0892*
    (2013.01); *B01J 2219/1203* (2013.01); *B01J*
    *2235/00* (2024.01); *B01J 2235/10* (2024.01);
    *B01J 2235/15* (2024.01); *B01J 2235/30*
    (2024.01); *C01B 2203/0277* (2013.01); *C01B*
    *2203/1088* (2013.01); *C01B 2203/1241*
    (2013.01)

(56) References Cited

U.S. PATENT DOCUMENTS

| | | | |
|---|---|---|---|
| 10,329,233 B2 | 6/2019 | Blair | |
| 2015/0141667 A1* | 5/2015 | Blank | B01J 21/063 |
| | | | 502/313 |
| 2020/0030781 A1* | 1/2020 | Hazin | B01J 35/617 |
| 2021/0331992 A1* | 10/2021 | Nandi | C07C 29/50 |

OTHER PUBLICATIONS

PE2E english translation of CN 114054068 (Year: 2022).*

Babenko, Vitaliy et al., "Time dependent decomposition of ammonia borane for the controlled production of 2D nexagonal boron nitride", Scientific Reports, 2017, vol. 7, No. 14297, 12 pages.

Cao, Yuehan et al., "B-O Bonds in Ultrathin Boron Nitride Nanosheets to Promote Photocatalytic Carbon Dioxide Conversion", ACS Appl. Mater. Interfaces, 2020, vol. 12, pp. 9935-9943.

Casiraghi, C. et al., "Bonding in hydrogenated diamond-like carbon by Raman spectroscopy", Diamond & Related Materials, 2005, vol. 14, pp. 1098-1102.

Chagoya, Katerina L. et al., "Mechanically Enhanced Catalytic Reduction of Carbon Dioxide over Defect Hexagonal Boron Nitride", ACS Sustainable Chem. Eng., 2021, vol. 9, pp. 2447-2455.

Chaturbedy, Piyush et al., "Oxidative Dehydrogenation of Propane over a High Surface Area Boron Nitride Catalyst: Exceptional Selectivity for Olefins at High Conversion", ACS Omega, 2018, vol. 3, pp. 369-374.

Chng, Soon Siang et al., "Nitrogen-mediated aligned growth of hexagonal BN films for reliable high-performance InSe transistors", J. Mater. Chem. C, 2020, vol. 8, pp. 4421-4431.

Choi, Changsoon et al., "Wearable and Implantable Soft Biolectronics Using Two-Dimensional Materials", Acc. Chem. Res. 2019, vol. 52, pp. 73-81.

Cloutis, Edward et al., "Identification and discrimination of polycyclic aromatic hydrocarbons using Raman spectroscopy", Icarus , 2016, vol. 274, pp. 211-230.

Cuesta, A. et al., "Raman Microprobe Studies on Carbon Materials", 1994, vol. 32, No. 8, pp. 1523-1532.

Dang, Jianchen et al., "Identifying defect-related quantum emitters in monolayer WSe2", 2D Materials and Applications, 2020, vol. 4, No. 2, 7 pages.

Deng, Dehui et al., "Catalysis with two-dimensional materials and their heterostructures", Nature Nanotechnology, Mar. 2016, vol. 11, pp. 218-230.

Ding, Yi et al., "Defect engineering in Boron Nitride for catalysis", MRS Communications, 2018, vol. 8, pp. 1236-1243.

Dippel, B. et al., "Soot Characterization in Atmospheric Particles From Different Sources By NIR FT Raman Spectroscopy" .I. Aerosol ScL, 1999 Vol. 30, Suppl. I, pp. S907-S908.

Dippel, B. et al., "NIR FT Raman spectroscopic study of Ñame soot", Phys. Chem. Chem. Phys., 1999, vol. 1, pp. 4707-4712.

Doniach, S. et al., "Many-electron singularity in X-ray photoemission and X-ray line spectra from metals", J. Phys. C: Solid State Phys., 1970, vol. 3, pp. 285-291.

Eckmann, Axel et al., "Probing the Nature of Defects in Graphene by Raman Spectroscopy", Nano Lett. 2012, vol. 12, pp. 3925-3930.

Estrade-Szwarckopf, Henriette, "XPS photoemission in carbonaceous materials: A "defect" peak beside the graphitic asymmetric peak", Carbon, 2004, vol. 42, pp. 1713-1721.

Geim, A.K. et al., "The rise of Graphine", Nature Materials, 2007, 14 pages.

Genisel, Mustafa Fatih et al., "Bias in bonding behavior among boron, carbon, and nitrogen atoms in ion implanted a-BN, a-BC, and diamond like carbon films", J. Appl. Phys., 2011, vol. 110, 074906, 11 pages.

Gomez-Aleixandre, C. et al., "Kinetic Study of the Diborane/ Methylamine Reaction: Composition and Structure of C-B-N Films", J. Phys. Chem. B, 2000, vol. 104, pp. 4397-4402.

Grant, J.T. et al., "Selective oxidative dehydrogenation of propane to propene using boron nitride catalysts", Science, Dec. 23, 2016, vol. 354, issue 6319, pp. 1570-1572.

Grant, Joseph T. et al., "Boron and Boron-Containing Catalysts for the Oxidative Dehydrogenation of Propane", ChemCatChem, 2017, vol. 9, pp. 3623-3626.

Guo, Yong et al.,Dredged Sediment-Promoted Synthesis of Boron Nitride-based Floating Photocatalyst with Photodegradation of Neutral Red under UV-light irradiation, ACS Appl. Mater. Interfaces, Jan. 5, 2018, 45 pages.

Han, Shenghui et al., "Water-soluble boron carbon oxynitride dots with excellent solid-state fluorescence and ultralong room-temperature phosphorescence", Nano Research, 2020, vol. 13, No. 12, pp. 3261-3267.

Herdman, Jennifer D. et al., "A comparison of Raman signatures and laser-induced incandescence with direct numerical simulation of soot growth in non-premixed ethylene/air flames", Carbon, 2011, vol. 49, pp. 5298-5311.

Hou, Lixin et al., "X-ray photoelectron spectroscopy study of cubic boron nitride single crystals grown under high pressure and high temperature", Applied Surface Science, 2012, vol. 258, pp. 3800-3804.

Islam, Molla Manjurul et al., "Optoelectronic synapse using monolayer MoS2 field effect transistors", Scientific Reports, 2020, vol. 10, No. 21870, 9 pages.

Jacques, S. et al., "Characterization of SiC/C (B)/SiC microcomposites by transmission electron microscopy", Journal of Materials Science, 1997, vol. 32, pp. 2969-2975.

Jawhari, T. et al., "Raman Spectroscopic Characterization of Some Commercially Available Carbon Black Materials", Carbon, 1995, vol. 33, No. 11, pp. 1561-1565.

Ji, Siyang et al., "Facile Production of a Fenton-Like Photocatalyst by Two-Step Calcination with a Broad pH Adaptability", Nanomaterials, 2020, vol. 10, No. 676, 11 pages.

Ji, Mengxia et al., "Graphene-like boron nitride induced accelerated charge transfer for boosting the photocatalytic behavior of Bi4O512 towards bisphenol a removal", Chemical Engineering Journal, 2018, vol. 331, pp. 355-363.

Jiang, Longbo et al., "Metal-free efficient photocatalyst for stable visible-light photocatalytic degradation of refractory pollutant", Applied Catalysis B: Environmental, 2018, vol. 221, pp. 715-725.

Jiang, Toa et al., "Syngas Molecules as Probes for Defects in 2D Hexagonal Boron Nitride: their Adsorption and Vibrations", Physical Chemistry Chemical Physics, 2012, 14 pages.

Konstantatos, Gerasimos, Current status and technological prospect of photodetectors based on two-dimensional materials, Nature Communications, 2018, 3 pages.

Kurapati, Rajendra et al., "Biomedical Uses for 2D Materials Beyond Graphene: Current Advances and Challenges Ahead", Adv. Mater., 2016, vol. 28, pp. 6052-6074.

Leong, Kah Hon et al., "Improved solar light stimulated charge separation of g-C3N4 through self-altering acidic treatment", Applied Surface Science, 2018, vol. 430, pp. 355-361.

(56) References Cited

OTHER PUBLICATIONS

Li, Junqi et al., "Constructing h-BN/Bi2WO6 Quantum Dot Hybrid with Fast Charge Separation and Enhanced Photoelectrochemical Performance by using h-BN for Hole Transfer", ChemElectroChem, 2018, vol. 5, pp. 300-308.

Li, Xiao et al., "Two-dimensional MoS2: Properties, preparation, and applications", Journal of Materiomics, 2015, vol. 1, pp. 33-44.

Li, Juan et al., "Water-assisted chemical vapor deposition synthesis of boron nitride nanotubes and their photoluminescence property", Nanotechnology, 2013, vol. 24, 7 pages.

Ling, Faling et al., "Optimizing edges and defects of supported MoS2 catalysts for hydrogen evolution via an external electric field", Phys.Chem.Chem.Phys., 2018, vol. 20, 26083-26090.

Liu, Dan et al., "Porous BN/TiO2hybrid nanosheets as highly efficientvisible-light-driven photocatalysts", Applied Catalysis B: Environmental, 2017, vol. 207, pp. 72-78.

Liu, Qiuwen et al., "Porous Hexagonal Boron Nitride Sheets: Effect of Hydroxyl and Secondary Amino Groups on Photocatalytic Hydrogen Evolution", ACS Appl. Nano Mater., 2018, vol. 1, pp. 4566-4575.

Loiland, Jason A. et al., "Boron-Containing Catalysts for the Oxidative Dehydrogenation of Ethane/Propane Mixtures", Ind. Eng. Chem. Res., 2019, vol. 58, pp. 2170-2180.

Love, Alyssa M. et al., "Probing the Transformation of Boron Nitride Catalysts under Oxidative Dehydrogenation Conditions", J. Am. Chem. Soc. 2019, vol. 141, pp. 82-190.

Malas, Asish et al., "Effect of the GO Reduction Method on the Dielectric Properties, Electrical Conductivity and Crystalline Behavior of PEO/rGO Nanocomposites", Polymers, 2017, vol. 9, No. 613, 21 pages.

Mannan, Hafiz et al., "Recent Applications of Polymer Blends in Gas Separation Membranes", Chem. Eng. Technol. 2013, vol. 36, No. 11, pp. 1838-1846.

Manzeli, Sajedeh et al., "Two-dimensional transition metal dichalcogenides", Nature Reviews, 2017, vol. 2, article 17033, 15 pages.

Marsden, Alexander J. et al., "Effect of oxygen and nitrogen functionalization on the physical and electronic structure of graphene", Nano Research, 2015, vol. 8, No. 8, pp. 2620-2635.

Moulder, John F. et al., "Handbook of X-ray Photoelectron Spectroscopy", Perkin-Elmer Corp, 1992, 260 pages.

Nash, David J. et al., "Heterogeneous Metal-Free Hydrogenation over Defect-Laden Hexagonal Boron Nitride", ASC Omega, 2016, vol. 1, pp. 1343-1354.

Natarajan, Gnanaseelan et al., "Two Dimensional-Based Materials for Photocatalysis Applications", Springer Nature Switzerland AG, 2020, 275 pages.

Pomerantseva, Ekaterina et al., "Two-dimensional heterostructures for energy storage", Nature Energy, Jun. 12, 2017, vol. 2, article No. 17089, 6 pages.

Puyoo, G. et al., "Boron carbonitride coatings synthesized by LPCVD, structure and properties", Carbon, 2017, vol. 122, pp. 19-46.

Qu, Jinglong et al., "Characterization of Flake Boron Nitride Prepared from the Low Temperature Combustion Synthesized Precursor and Its Application for Dye Adsorption", Coatings, 2018, vol. 8, No. 214, 12 pages.

Robertson, Rusli J. et al., "Photoluminescence behavior of hydrogenated amorphous carbon", Journal of Applied Physics, 1996, vol. 80, No. 2998, 7 pages.

Sadezky, A. et al., Raman microspectroscopy of soot and related carbonaceous materials: Spectral analysis and structural information, Carbon, 2005, vol. 43, pp. 1731-1742.

Saugnac, Frederic et al., "Characterization of C-B-N solid solutions deposited from a gaseous phase between 900 and 1050 C", J. Am. Ceram. Soc., 1992, vol. 75, No. 1, pp. 161-169.

Schulz, Fabian et al., "Insights into incipient soot formation by atomic force microscopy", Proceedings of the Combustion Institute, 2019, vol. 37, pp. 885-892.

Seaong, Hee Je et al., "Evaluation of Raman Parameters Using Visible Raman Microscopy for Soot Oxidative Reactivity", Energy Fuels, 2013, vol. 27, pp. 1613-1624.

Song, Li et al., "Large scale growth and characterization of atomic hexagonal Boron Nitride layers", Nano Lett., 2010, vol. 10, pp. 3209-3215.

Sudeep, P.M. et al., "Functionalized boron nitride porous solids", RSC Adv., 2015, vol. 5, pp. 93964-93968.

Sze, S.K. et al., "Raman spectroscopic characterization of carbonaceous aerosols", Atmospheric Environment, 2001, vol. 35, pp. 561-568.

Tian, Jinshu et al., "Propane oxidative dehydrogenation over highly selective hexagonal boron nitride catalysts: The role of oxidative coupling of methyl", Sci. Adv., 2019, vol. 5, 6 pages.

Turiansky, M.E. et al., "Spinning up quantum defects in 2D materials", Nature Materials, May 2020, vol. 19, pp. 481-490.

Ungar, T. et al., "X-ray line-broadening study of the dislocation cell structure in deformed [001]-orientated copper single crystals", Acta Metall., 1984, vol. 32, No. 3, pp. 333-342.

Voiry, Damien et al., "Low-dimensional catalysts for hydrogen evolution and CO2 reduction", Chemistry, 2018, vol. 2, article No. 0105, 17 pages.

Wang, jingang et al., "Graphene, hexagonal boron nitride, and their heterostructures: properties and applications", RSC Adv., 2017, vol. 7, pp. 16801-16822.

Wang, Shujuan et al., "Atomic Structure of Defects and Dopants in 2D Layered Transition Metal Dichalcogenides", Journal of Materials Chemistry A , 2018, vol. 6, 10868, 70 pages.

Xiong, jun et al., "Surface Defect Engineering in 2D Nanomaterials for Photocatalysis", Adv. Funct. Mater., 2018, vol. 28, No. 1801983, 19 pages.

Xu, Li et al., "Fabrication and microstructure of boron-doped isotropic pyrolytic carbon", Carbon, 2012, vol. 50, pp. 4705-4710.

Yi, Fang et al., "Wearable energy sources based on 2D materials", Chem. Soc. Rev., 2018, vol. 47, pp. 3152-3318.

Yun, Jin et al., "The Effect of Introducing B and N on Pyrolysis Process of High Ortho Novolac Resin", Polymers, 2016, vol. 8, No. 35, 17 pages.

Zhang, Hua et al., "2D nanomaterials: beyond graphene and transition metal dichalcogenides", Chem. Soc. Rev., 2018, vol. 47, pp. 6009-6012.

Zhang, Jijun et al., "Point defects in two-dimensional hexagonal boron nitride: A perspective", J. Appl. Phys., 2020, vol. 128, No. 100902, 21 pages.

Zhang, Ruiyang et al., "Preparation of hydrophobic polyvinyl alcohol aerogel via the surface modification of boron nitride for environmental remediation", Applied Surface Science, 2017, vol. 419, pp. 342-347.

Zhang, Ling et al., "Electrochemical Ammonia Synthesis via Nitrogen Reduction Reaction on a MoS2 Catalyst: Theoretical and Experimental Studies", Adv. Mater., 2018, vol. 30, No. 1800191, 6 pages.

Zhu, Feng-feng et al., "Epitaxial growth of two-dimensional stanene", Nature Materials, Oct. 2015, vol. 14, pp. 1020-1025.

Dresselhaus, M.S. et al.,"Intercalation compounds of graphite", Advances in Physics, 1981, vol. 30, pp. 139-326.

* cited by examiner (a)

(b)

| M | Reaction time (s) | Spot radius (μm) |
|---|---|---|
| None | No reaction | N/A |
| 50X | 2103 | 5.25 |
| 20X | 4590 | 32.21 |
| 10X | 4195 | 49.73 |

SOLAR PRODUCTION OF HYDROGEN USING DEFECT ENGINEERED BORON-RICH PHOTOCALYSTS

BACKGROUND

Two-dimensional (2D) materials have revealed fascinating behaviors since the discovery of graphene.[1] The ability to tune the bandgap of semiconducting 2D layers using large scale processing (plasma, thermal treatment) or local treatment has led to a myriad of fundamental studies related to electronic and optoelectronic properties.[2] As a result, hexagonal boron nitride (h-BN),[3] transition metal dichalcogenides (TMDs),[4] and other single atom-based systems such as borophene and stanene[5] are now considered as building blocks for the creation of functional monolayers and heterostructures with unique functionalities.[6] With the current understanding of their capabilities and limitations, it is possible to enable material discoveries for applications including in biomedical research,[7] energy storage,[6a] wearable devices,[8] optoelectronics,[2c] highly sensitive detectors,[9] and hazardous molecules capture and conversion.[10]

Despite these intense efforts, poor scalability remains a significant challenge hindering the rapid implementation of rationally designed structures for targeted functionalities in devices.[11] In addition, in their monolayer form, the materials are extremely sensitive to intrinsic and extrinsic defects as well as to perturbations from substrate interactions and from environmental conditions. In graphene for instance, these engender important losses in electron mobility. Controlling such perturbations is difficult, which results in devices performing far below the theoretically predicted values. On the other hand, local electronic density changes observed at defect sites suggest that exciting applications in quantum science and catalysis should be considered. Recently, defect-bound band edge states have led to the formation of quantum emitters[12] and highly reactive catalysts.[13] The design of catalysts exploiting local defects or dopants in 2D materials has the potential to improve the reactivity and selectivity of chemical processes, including for industrial practices, leading in turn to better efficiency and sustainability.

Defect engineering has been reported to improve reactivity of other 2D materials, such as TMDs, including the tailoring of molybdenum disulfide (MoS2) edges, forming a functional material with great promise for ammonia synthesis[13e] and the hydrogen evolution reaction (HER).[13c] Heterostructures are also expected to exhibit competitive performance, as in the case of MoS2-reduced graphene oxide films for HER.[14] Even materials with well-established chemical inertness, such as h-BN, can be turned into interesting catalysts as seen in recent reports on propene hydrogenation[15] and CO2 reduction.[16] Various processes are being considered to introduce defects in h-BN. [17] Mechanical milling of large amounts of h-BN has proven effective for catalysis.[13b, 15-16] Defects in the 2D lattice introduce states in the bandgap making it possible to tune the electronic structure of the material, and thus to enable photochemical processes occurring at specific wavelengths.[18] Over the years, h-BN has been found to enhance the photocatalytic activity of mixtures and composites with Bi2WO6,[19] gC3N4,[20] Bi4O5I2,[21] TiO2 [22] and DS-7,[23] acting as a hole carrier promoter or as a hole carrier transport channel. Visible light absorption of the composite, and even electron absorption in some instances, were improved by the presence of h-BN. Moreover, it was proposed that formation of OH radicals could take place on h-BN nanoplates mixed with DS-7.[23] More recently, photocatalytic hydrogen evolution was studied on porous h-BN sheets with hydroxyl and secondary amino group functionalization at the edge, which demonstrated a bandgap reduction from ~6 eV for commercial h-BN to ~4.2 eV.[24] However, to date, photocatalytic processes in the visible range have not yet been reported in defect-laden h-BN (dh-BN). Understanding the interaction of light, defects and environmental gases in h-BN is all the more important that similar defects are being considered to produce quantum emitters at room temperature under ambient conditions, without a clear understanding of the nature of the interplay.

BRIEF DESCRIPTION OF THE DRAWINGS

The present embodiments are illustrated by way of example, and not by way of limitation, in the figures of the accompanying drawings.

The following figures are illustrative only, and are not intended to be limiting

DEFINITIONS

Figure 1:
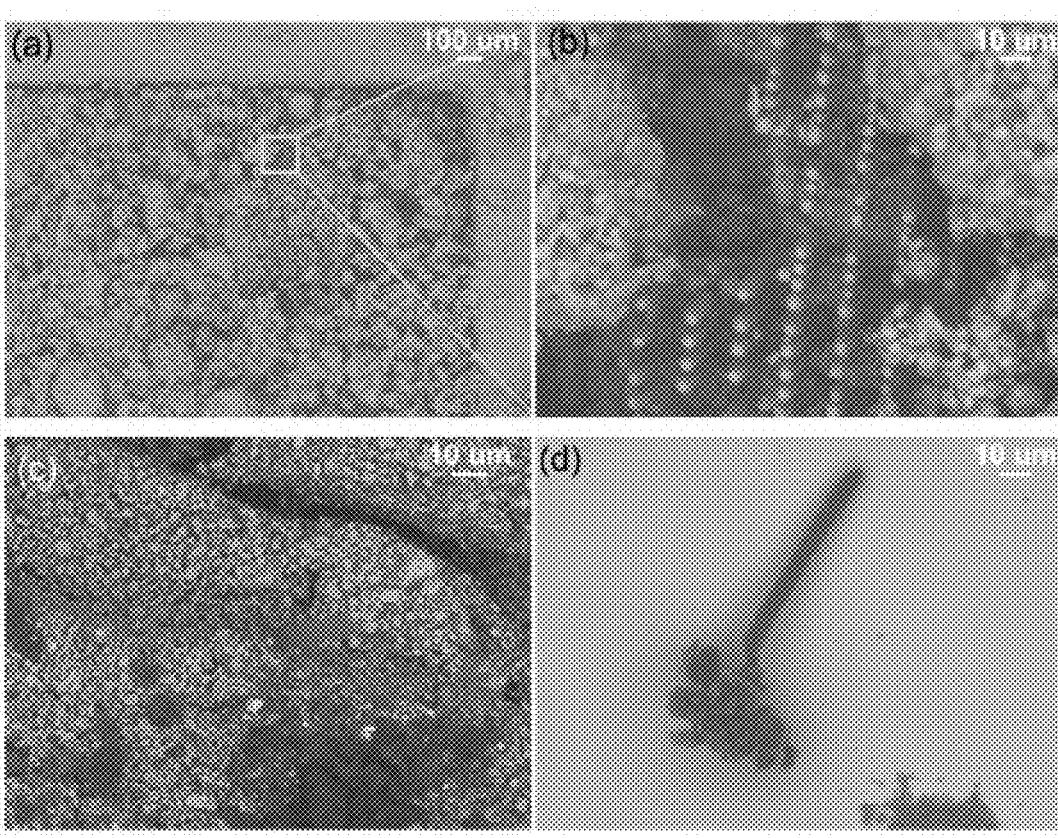
FIG. 1 is a (a) SEM image of the dh-BN powder positioned treated with the laser light. The lighter flakes correspond to h-BN flakes with carbon matrix developing between the flakes.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described. All publications mentioned herein are incorporated herein by reference.

The methods and techniques of the present invention are generally performed according to conventional methods well known in the art and as described in various general and more specific references that are cited and discussed through the present specification unless otherwise indicated.

The use of the word "a" or "an" when used in conjunction with the term "comprising" may mean "one", but it is also consistent with the meaning of "one or more", "at least one", and "one or more than one". The use of the term "or" is used to mean "and/or" unless explicitly indicated to refer to alternatives only if the alternatives are mutually exclusive, although the disclosure supports a definition that refers to only alternatives "and/or". Throughout this application, the term "about" is used to indicate that a value includes the inherent variation of error for the quantifying device, the method being employed to determine the value, or the variation that exists among the study subjects. For example, but not by way of limitation, when the term "about" is utilized, the designation value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and is not meant to imply any sequence or order or importance to one item over another or any order of addition, for example.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

DETAILED DESCRIPTION

It was found that dehydrogenation of hydrocarbons occurs in the presence of defects under visible illumination, forming a dark carbonaceous product. Analysis of this material with X-ray photoemission spectroscopy and Raman spectroscopy suggests the activation of sp3, sp2, and sp carbon by the combination of defects and light, followed by the formation of hydrogen, cyclic organic compounds, hydrogenated carbon, and polycyclic aromatic hydrocarbons with high fluorescence, which are gradually converted to graphitic crystallites. Continued growth can be controlled to obtain carbon materials. Measurements carried out at different temperatures, laser powers (above 16 mW) and exposure durations show similar products at the illumination site. Similar phenomenon was observed when pressurizing defect-laden h-BN with carbon monoxide (CO). These findings highlight a new functionality of defect engineering in h-BN and boron-rich materials for visible light-assisted capture and conversion. This discovery can enable the low temperature production of hydrogen from hydrocarbon source and other applications such as sensing or quantum devices.

The conversion of hydrocarbons is important for numerous applications, including the petroleum and bio-based industries. Conversion is commonly done using catalysts, which are made of precious metals. The use of precious metals as catalysts presents several limitations including their costs and their limited availability. In addition, traces of metals are often found in the products of reactions taking place on these catalysts, which can be harmful to the environment and to humans. However, it is very challenging to overcome such leaching from metal-based catalysts.

This disclosure provides a new way to use visible light to activate a chemical reaction in presence of a metal-free catalyst. The system presented constitutes a heterogeneous catalyst as the catalyst is the solid phase and the reactant is in gas phase. The products of the reaction of hydrocarbons with the boron-rich materials such as 2d-boron and defect-laden h-BN catalyst include a gas that is being released together with the formation of a carbonaceous structure on the catalyst surface. Commonly, the synthesis of carbon materials requires significantly higher amount of energy and time. The process described in this invention does not require high temperature or special reagents/precursors that would leave impurities in the final structures. The catalyst being metal-free leads to the formation of structures that can only contained C with potential traces of B and N, none of which are toxic to humans or the environment. This carbon capture allows to release hydrogen in gas form.

Currently industrial hydrogen is produced through steam reformation at high temperatures. The by-product of this process is the greenhouse gas carbon dioxide. This discovery allows hydrogen production at low temperatures and produces carbon as a by-product with no release of greenhouse gases or pollutants.

Defect engineering, especially but not limited to 2D materials, provides new opportunities for heterogeneous catalysis. Hydrogenation of propene and reduction of carbon dioxide ($CO_2$) can be achieved on metal-free hexagonal boron nitride (h-BN) using mechanochemistry, while structural engineering of h-BN and boron with induces photocatalytic activity in the ultraviolet range for hydrogen evolution.

In some embodiments, the effect can be obtained with visible illumination including with a laser, lamp, solar illuminator, or directly under the sun.

The presence of hydrogen is detected in the gas formed in the chamber. Analysis of the carbonaceous material with X-ray photoemission spectroscopy, X-ray spectroscopy and Raman spectroscopy suggests the presence of graphitic crystallites and amorphous carbon. Measurements carried out at different temperatures, laser fluence and exposure durations show similar products at the illumination site.

It uses Boron-based catalyst which is obtained by introducing defects in a fairly abundant material. This has the potential to lower the cost of catalysts by circumventing the need for noble metals such as Pt or Pd. The photocatalytic conversion takes place in the visible range, which makes it possible to design processes taking advantage of solar illumination in the future. Importantly activity is observed near the solar maximum of 500 nm. The dehydrogenation of hydrocarbons obtained in this process produces hydrogen as a product. The hydrogen produced is free from contaminants such as higher polyaromatic compounds, carbon dioxide or carbon monoxide which are common in reactions carried out at higher temperatures on conventional catalysts. The carbon material formed during the reaction present the advantage of being impurity-free. Tuning the process of reaction (nature of the gas, pressure, temperature, etc) can be used to vary the properties of the carbon material for desired applications.

Hydrogen production is achieved at ambient temperatures with solar illumination, making it potentially applicable for large-scale production of hydrogen in solar farms. Since only visible and UV light is required, heat can be co-harvested for simultaneous steam generation. The new photocatalyst can be used for the capture and conversion of methane to:

a. Eliminate emission of methane gas, a high greenhouse capacity gas (40× that of $CO_2$)

b. Generate carbon and blue hydrogen from petroleum extraction and processing c. Produce carbon and green hydrogen from sources such as landfills and manure ponds.

The environment of the B atom can be further modified for new targeted reactions supplanting precious metal-based catalysts in refineries. The carbon material formed can find applications in energy materials (batteries, supercapacitors), solar cells, sensors, devices used in nanoelectronics, composite materials for automobile, sporting good, construction, etc.

EXAMPLES

Example 1

Here a light-assisted synthesis method is reported to produce arrays of aligned carbon fibers with tunable dimensions. This contrasts with conventional fabrication of carbon materials, which often require high temperature, without the possibility to align or position the structures on demand. Infrared spectra collected on the carbon product on the catalyst show that the material contains a composite of dh-BN with carbon activated molecules.

Methods

Catalyst preparation. Defect-laden h-BN (dh-BN) was prepared from pristine h-BN powder by ball milling. Before milling, moisture was removed from the commercial pristine powder was dried in vacuo at 400° C. for 12 h. After this step, all manipulations of the powder were carried out under argon environment. Ball milling was performed in a mixer/mill and zirconia vials sealed with silicone O-rings 2.0 g of h-BN was milled using a 19.05-mm-diameter zirconia ball weighing ~26.6 g (ball to powder ratio of 12.8:1) for 120 min. Freshly produced dh-BN was loaded in the argon-filled environmental chamber.

Conversion for hydrogen production. dh-BN is pressurized under propene (276 kPa) at room temperature using an environmental chamber.

A 532-nm laser at laser power of 15 to 200 mW was focused on the powder using various objectives (10×, 20×, 50×LD) for a given time of exposure (from few seconds to several hours). Electron microscopy. The morphology of the powder was evaluated by scanning electron microscopy (SEM, Hitachi).

In situ Raman spectroscopy and analysis. Raman spectra were collected on confocal optical microscope (WITec Alpha 300RA with 532-nm laser excitation) using a 100× objective (Zeiss), 600 lines/mm grating and charge coupled device (CCD) detector. The excitation laser was maintained at a low laser power of 5.7 mW to prevent activating any reaction in the chamber during the measurement.

The k-means cluster analysis was carried out in the WITec Project Four software. The algorithm computes the distance from each spectrum to each centroid and assigns it to its closest centroid. The clustering was used to partition the spectra collected in the hyperspectral image by considering the intensity of their fluorescence background and the nature of the Raman bands in each spectrum. For this, the dataset was not normalized.

Results

The first step after synthesis of the fibers was to investigate their morphology. In FIG. 1 the morphology of the dh-BN powder after carbon growth is depicted.

Figure 2:
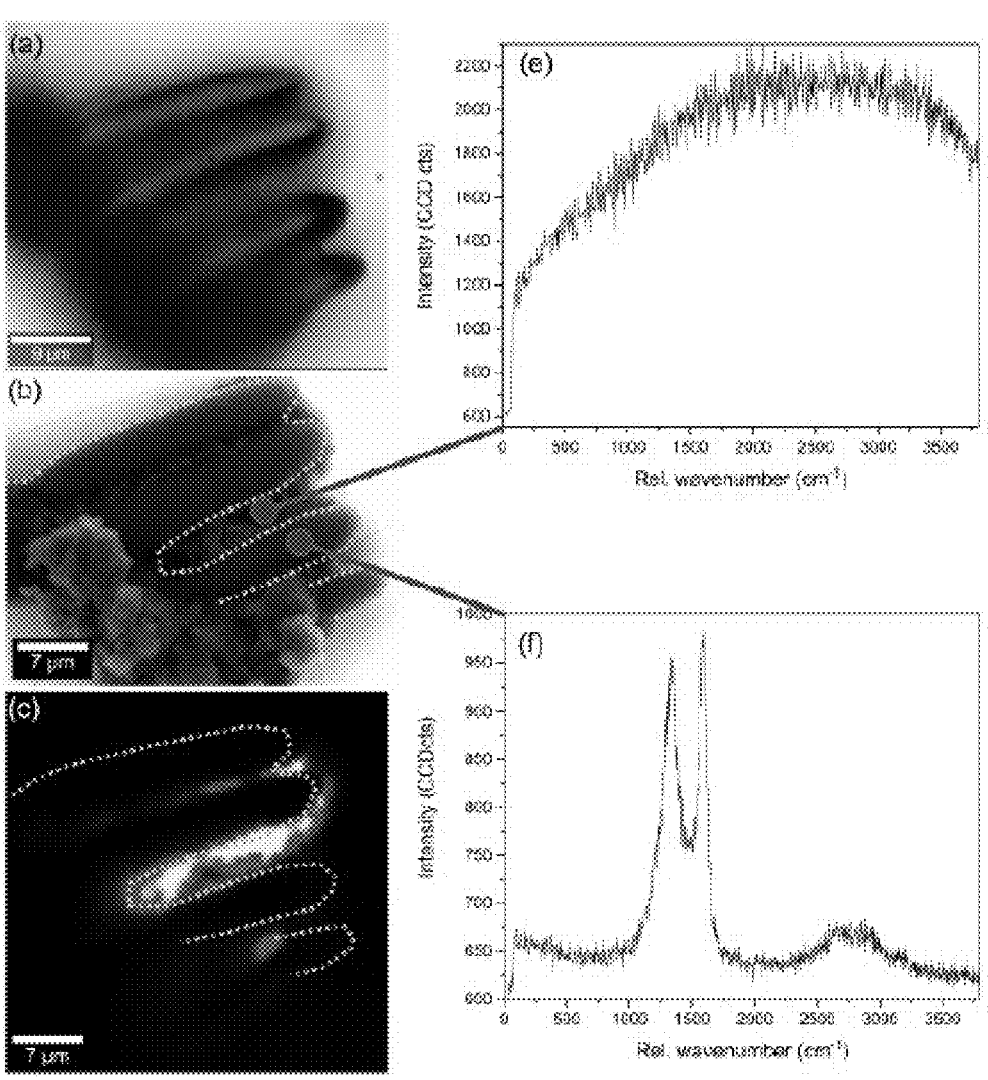
FIG. 2 shows the study of the composition of the reacted region, with infrared spectroscopy, indicating the presence of both h-BN and carbon bonds.

Further analysis of the carbon material was performed with infrared spectroscopy, as shown in FIG. 2. Additionally, Raman spectra collected in the core of the columns exhibited the representative D and G bands of carbon materials with a band centered at 1335 cm-1 and the second centered around 1600 cm-1. The D+G band was also observed in the 2500-3100 cm-1 range.

Example 2

The effect of illuminating h-BN and dh-BN with visible light on the interaction with propene, propane, CO, $CO_2$, and air are reported. Carbonaceous material is formed in presence of propene or CO adsorbed on dh-BN under excitation with visible light. The effects of laser exposure time, laser power, and temperature on the reactions observed with propene are elucidated. The spectroscopic signatures obtained with micro-Raman spectroscopy and X-ray photoelectron spectroscopy (XPS) reveal the mechanisms at play during these photo-induced reactions.

1. Experimental Section/Methods

Materials preparation. Pristine h-BN powder was dried in vacuo at 400° C. for 12 h to remove moisture and stored in an argon-filled glovebox. All manipulations of the powder were performed under inert conditions in an argon-filled glovebox. Plastic tools were used to prevent any contamination from metal. Ball milling was performed in zirconia vials sealed with silicone O-rings and a custom clamping mechanism. A mixer/mill was utilized to supply the mechanical force. Standard batches consisting of 2.0 g of h-BN and one 19.05-mm-diameter zirconia ball weighing ~26.6 g (ball to powder ratio of 12.8:1) were milled for 120 min under inert conditions. Freshly produced dh-BN was loaded in the argon-filled glovebox for Raman analysis without any further processing.

Transmission electron microscopy (TEM) characterization and analysis. The morphology of the powder was evaluated by TEM (FEI Tecnai F30). The interplanar spacing was measured using ImageJ.

X-ray diffraction (XRD) characterization and analysis. The crystalline structure of the flakes was evaluated with XRD (PANalytical Empyrean), equipped with a 1.8 KW copper X-ray tube radiation source. Collection was set to 2 s per step. Measurements were carried out from 10 to 90° with a step size of 0.05°. The strain ε in h-BN and dh-BN was estimated on the basis of the Scherrer algorithm using the tangent equation: $\varepsilon = \sqrt{(B^2_{exp} - B^2_{std})}/4 \tan \theta$, where $B_{exp}$ and $B_{std}$ refer respectively to the experimental (sample) and the reference (standard) broadenings (in radians) estimated using the integral breadth method (using the ratio of the peak area over its height to estimate the width) and θ is the Bragg angle.

In situ Raman spectroscopy and analysis. h-BN and dh-BN powders were packed into 2×2 mm² wells of 1 mm depth, in an inert atmosphere glovebox before being sealed in a custom flow cell to maintain inert conditions. Once transferred out of the glovebox, the cell was pressurized with the desired gas (propene, CO, propane, $CO_2$, $H_2$) at 276 kPa. Pressure and temperature were monitored throughout the experiment. Temperature control was achieved using a heater, operating in the temperature range between 24° C. (referred to as room temperature (RT) herein) and 80° C., inserted in the body of the chamber in proximity of the chamber containing the powder. When increasing the temperature, measurements were performed after thermal equilibrium in the chamber was reached, as monitored from the temperature sensor. When illuminating h-BN with visible light to study the photocatalytic reactions, laser light was focused on the powder using a 10× objective (Zeiss, N.A.=0.2), unless otherwise mentioned. The environmental chamber was designed with a sapphire window to allow optical imaging and Raman spectroscopy measurements. Measurements were performed on confocal optical microscopes (WITec Alpha 300RA for excitation at 532 nm and HORIBA LabRAM for excitation at 473, 633, 785 and 1064 nm). The excitation laser was maintained at a low laser power of 5.7 mW to prevent activating any reaction in the chamber during the measurement. A 50× long distance objective (Zeiss, N.A.=0.55) was used to focus the excitation laser and collect the scattered light. Rayleigh scattering was filtered using a notch filter before reaching the spectrometer. After being dispersed by the grating (600 lines/ mm), photons were collected for an integration time of 5 s with the charge coupled device (CCD) detector. 10 scans were averaged for each measurement. Curve fitting to evaluate the spectral components was carried out with Fityk 1.3.1 after background removal of the constant noise (581 cts) and Gaussian smoothing with standard deviation (SD) of 2.

The k-means cluster analysis was carried out in the WITec Project Four software. The algorithm computes the distance from each spectrum to each centroid and assigns it to its closest centroid. The clustering was used to partition the spectra collected in the hyperspectral image into 4 clusters by considering the intensity of their fluorescence background as it is important to the reaction process. For this, the dataset was not normalized. Each cluster was extracted as a field mask. The masks were overlaid with 4 different colors to represent the spatial variation of the data. The masks were also used to calculate the average spectrum of each cluster for comparison.

Fourier transform infrared (FTIR) spectroscopy. FTIR spectra were collected in air on samples freshly removed from the flow cell to limit the interaction with air. The interferometer of the FTIR spectrometer (PerkinElmer Spectrum 100 series) was set for a spectral resolution of 4 cm$^{-1}$. The powder was pressed on the diamond-coated ZnSe prism of the attenuated total reflection (ATR) prism using the mechanical knob with force gauge. All spectra were collected as averages of 10 scans.

X-ray photoelectron spectroscopy (XPS). BEs were studied using an X-ray photoelectron spectrometer (Thermo Scientific Escalab Xi+) with an aluminum radiation source. The spot size was 200 μm, and the investigated energy range spans from 0 to 1350 eV. Charge compensation was used for all scans. Three scans were averaged for the survey spectra, with a step size of 0.5 eV and a dwell time of 20 ms. The high-resolution (HR) XPS spectra were recorded using energy step of 0.05 eV and a dwell time of 50 ms. 10 scans were averaged for each element range. Measurements were calibrated using a gold sample with reference to the Au 4f7/2 and Au 4f5/2 lines respectively located at 84 and 87.67 eV (when using the Al Kα radiation),[30] according to the Doniach-Sunjic method [56].

2. Results and Discussion

Figure 3:
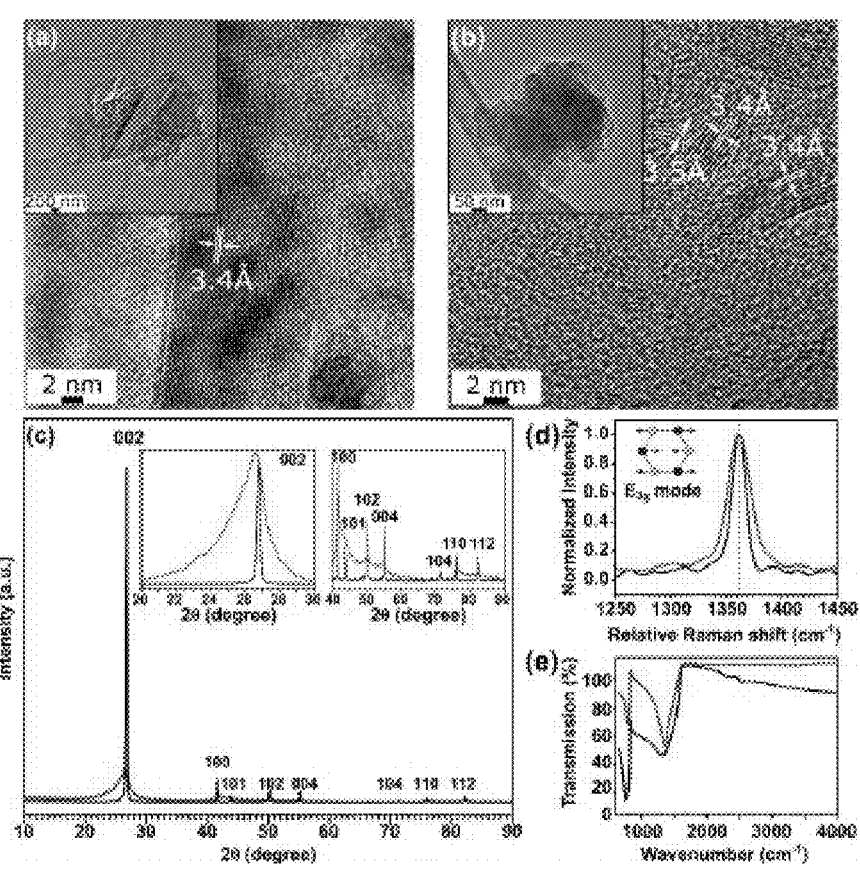
FIG. 3 shows the effect of ball milling on the structure of h-BN. (a) TEM images of untreated h-BN showing regular stacks with the h-BN interlayer distance d=3.4 Å. (b) TEM images of milled h-BN (referred to as dh-BN) showing regions with disordered stacks. (c) XRD spectra of untreated h-BN (black curve) and dh-BN (red curve). (d) Raman spectra of untreated h-BN (black curve) and dh-BN (red curve) centered at 1368 cm$^{-1}$, region of the $E_{2g}$ mode of h-BN in-plane vibrations. (e) FTIR spectra of untreated h-BN (black curve) and dh-BN (red curve).

Introduction of defects in h-BN. h-BN was milled for 120 min to introduce a similar concentration of defects as in previous work by Ding et al.[13b] The resulting changes in morphology were examined by transmission electron microscopy (TEM) (FIG. 4a,b), X-ray diffraction (XRD) (FIG. 4c), Raman and infrared spectroscopy (FIG. 3d,e). Typical TEM images of the flakes found in the powder before (FIG. 3a) and after milling (FIG. 3b) indicate a reduction in the lateral dimensions of the h-BN flakes (from ~3.5 μm to ~0.5 μm) after ball milling, in agreement with previous work.[13b] High-resolution (HR) TEM images revealed a typical interplanar distance d of 3.4 Å in ordered stacks of untreated h-BN, which corresponds to the d-spacing of h-BN.[25] After milling, similar interplanar distances could be observed, though the regions were significantly smaller with some distinct curves, suggesting a highly disordered state in the material (FIG. 3b).

XRD measurements confirmed that changes in the morphology of the flakes are accompanied by structural changes (FIG. 3c). The XRD spectrum of h-BN exhibits bands corresponding to the (002), (100), (101), (102), (004), (103), (104), (110), (112) and (006) orientations, in agreement with the ICDD pattern ref. 01-085-1068. Significant decrease in amplitude and broadening of the (002) peak in dh-BN is attributed to a decrease in the size of crystalline domains due to milling. In addition, the asymmetric broadening of the diffraction peaks (as shown particularly for the two prominent peaks of the (002) and (100) reflection planes) indicates the presence of ordered dislocations after milling.[26]

The crystallite size L of dh-BN can be estimated from the full width at half maximum (FWHM) β of the (002) diffraction peak with the Bragg angle θ (13.3°), and the wavelength λ (1.5406 Å) of the Cu Kα radiation using the Scherrer equation L=0.9λ/(β cos θ).[27] Our data suggest a decrease in the crystalline planar domains from L=33.2 nm (strain of 0.43%) in pristine h-BN to L=11.8 nm (strain of 1.42%) in dh-BN after 2 h of ball milling. We note that this remains an estimation of the crystalline domain size as other factors such as stress and strain or lattice imperfections and impurities could also affect the peak width.

Furthermore, the broadening of the $E_{2g}$ vibrational mode (i.e., in-plane phonon vibrations of the B and N atoms in opposite directions) of h-BN at 1368 cm$^{-1}$ with constant center position (FIG. 3d) indicates a decrease of the crystallite size rather than changes of the stress/strain state due to milling. This is in agreement with the study by Ding et al.[13b] in which an incremental broadening of the band was observed when increasing the duration of milling process from 30 to 120 min. Such a broadening was previously attributed to the presence of defects[13b] and decrease in crystalline domain sizes. The infrared active vibrations of the lattice were studied with Fourier transform infrared (FTIR) spectroscopy (FIG. 3e). The FTIR spectrum of h-BN shows two prominent peaks at 758 and 1340 cm$^{-1}$, which respectively stem from the $A_{1u}$ out-of-plane B—N—B bending vibration and the Elu in-plane B—N stretching vibration of the sp$^2$ bonded h-BN.[28] The milling treatment leads to a blue shift of these characteristic vibrations (to 786 and 1355 cm$^{-1}$, respectively) as a result of bonds shortening due to the compressive stress (pressure increase during ball milling) of the material. Besides, the FTIR spectrum of milled h-BN (labeled dh-BN hereafter) revealed no characteristic signatures of B—N—O (around 960 and 1165 cm$^{-1}$) and B—O—H (around 1100 cm$^{-1}$) vibrations,[29] most likely thanks to the very short exposure of the fresh dh-BN powder to air before the measurement.

Nature of defects introduced by ball milling. The effect of milling on the B—N lattice was investigated further with XPS. The XPS survey scans of untreated h-BN and dh-BN powder are displayed in FIG. 4a. For h-BN, one can distinguish prominent lines corresponding to boron and nitrogen is core levels respectively at about 190 and 398 eV, as well as KLL Auger transitions of B (1310 eV) and N (1105 eV).[30] In addition, the h-BN spectrum displays no signature of carbon but a weak feature of O 1 s around 532 eV. After ball milling, the photoelectron spectrum exhibits a significant increase of the O 1 s intensity, and O KLL Auger transitions (978, 999, and 1015 eV).

The increase of oxygen content (from 1.6 to 7 at. %) in dh-BN could be interpreted as a result of the sole contribution of adsorbed oxygen due to exposure to air during the cell transfer to the XPS analysis chamber (and to a much lesser extent due to residual oxygen in the glovebox during the milling). However, the dh-BN spectrum exhibits a very weak C is core level signal (~2 at. %) due to adsorbed carbon contaminants (C—C and C—H bonds), also present in air during the sample transfer to the XPS chamber. Hence, the increase of oxygen intensity observed for dh-BN is likely related to chemisorbed rather than adsorbed oxygen. Finally, it is worth noting that the B/N atomic ratio slightly increased after ball milling from 1.1 to 1.7, suggesting that N vacancies are likely preferentially formed as a result of ball milling.

To gain better insight into the chemical properties of dh-BN, narrow scans were performed of B 1 s, N 1 s, C 1 s, and O 1 s photoelectron lines as depicted by the normalized intensities presented in FIG. 4b-e (open circles). These HR spectra were deconvoluted into sums of Voigt (Gaussian-Lorentzian) functions (solid black lines).

Evidence of visible photocatalytic activity of dh-BN. First, the photocatalytic activity of dh-BN under propene atmosphere was studied. Propene hydrogenation and $CO_2$ reduction over dh-BN have been achieved with mechanochemistry.[15-16] DFT calculations indicated that both nitrogen and boron vacancies, boron substitution and Stone-Wales defects can weaken olefin bonds, although N vacancies were found to be more active.[15, 40] Few studies considering propane dehydrogenation have also been reported on defect-laden h-BN.[41]

Figure 5:
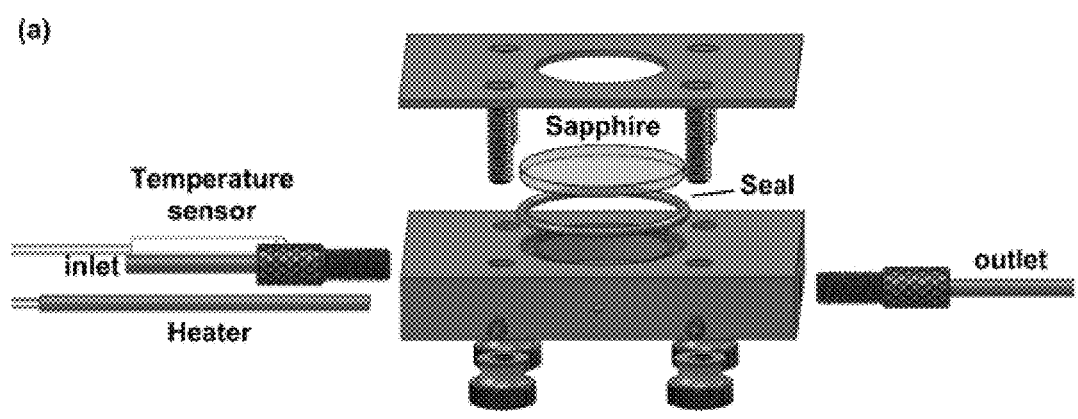
FIG. 5 is a (a) schematic of the custom-made environmental cell designed to control the environmental gas, temperature and pressure during the reaction. (b) Representation of the environmental-controlled setup used to evaluate the photocatalytic properties of dh-BN.
Figure 5:
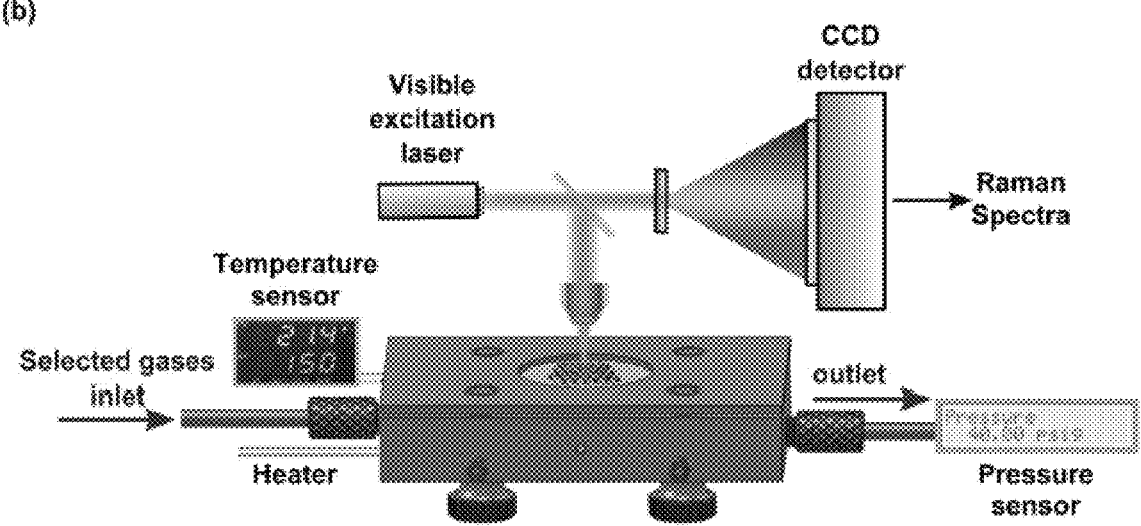
Figure 6:
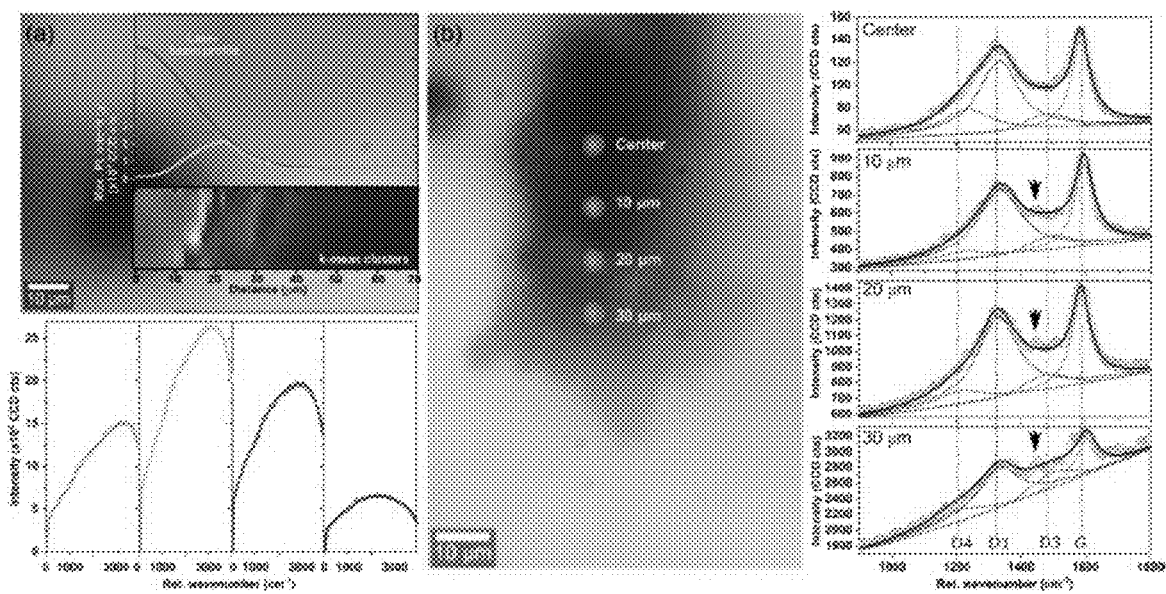
FIG. 6 shows (a) Optical image of a dh-BN region after 532 nm illumination in presence of propene. The k-mean (k=4) cluster map overlaid on the optical image indicates the spatial variations of the fluorescence background of the Raman spectra collected from the center up to 70 µm away from the center. The average spectrum of each cluster is presented below the image. The variation of the maximum intensity of the spectrum is plotted as a function of distance (white curve above the cluster map) and compared to the laser beam profile (green curve). (b) Raman spectra collected at four points in the reacted region, exhibiting signs of soot-like formation, are deconvoluted using D1, D3, D4 and G bands as detailed in Table 2. The presence of an additional band at 1450 cm$^{-1}$, indicating the presence of $CH_2$ groups, is marked by black arrows.
Figure 7:
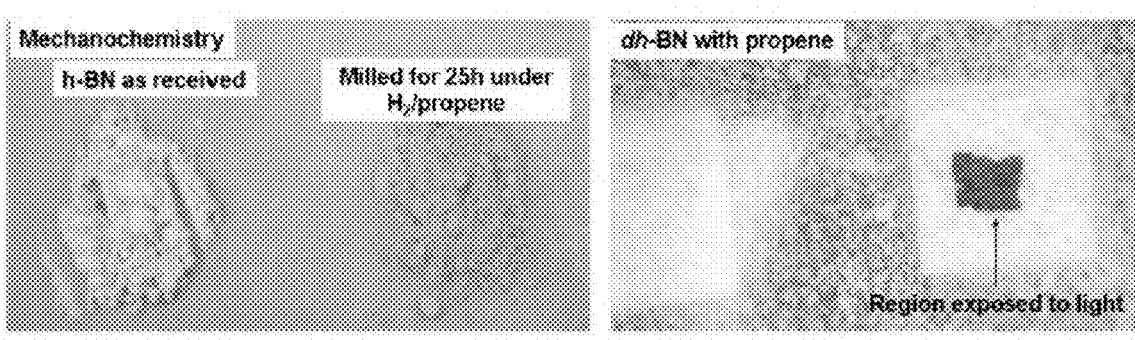
FIG. 7 shows (left) powder of dh-BN after propene dehydrogenation by mechanochemistry and (right) soot formation on dh-BN pressurized with propene after illumination with visible (532 nm) laser light.

In the experiments, the powder was placed in a custom-designed environmental-control cell (FIG. 5a) pressurized with propene (276 kPa) at room temperature (24° C.). The excitation laser was focused on the powder through a sapphire window as shown in FIG. 5b. Raman spectra of dh-BN were collected for about 60 min under laser power of 25 mW. The Raman signature of h-BN pressurized with propene remained unchanged under exposure. It retained its single narrow peak at 1368 cm$^{-1}$ corresponding to the $E_{2g}$ mode. On the other hand, a significant change in the Raman spectrum was observed when illuminating dh-BN in presence of propene. The fluorescence background of the spectra increased over time until the single band at 1368 cm$^{-1}$ could not be distinguished, followed by the appearance of two prominent bands around 1329 cm$^{-1}$ and 1580 cm$^{-1}$ indicative of a carbonaceous material. Accordingly, the visual inspection of the area under illumination revealed a significant darkening of the powder (FIG. 6). We note that previously reported propene hydrogenation on dh-BN did not result in any significant darkening of the powder (FIG. 7).

Figure 8:
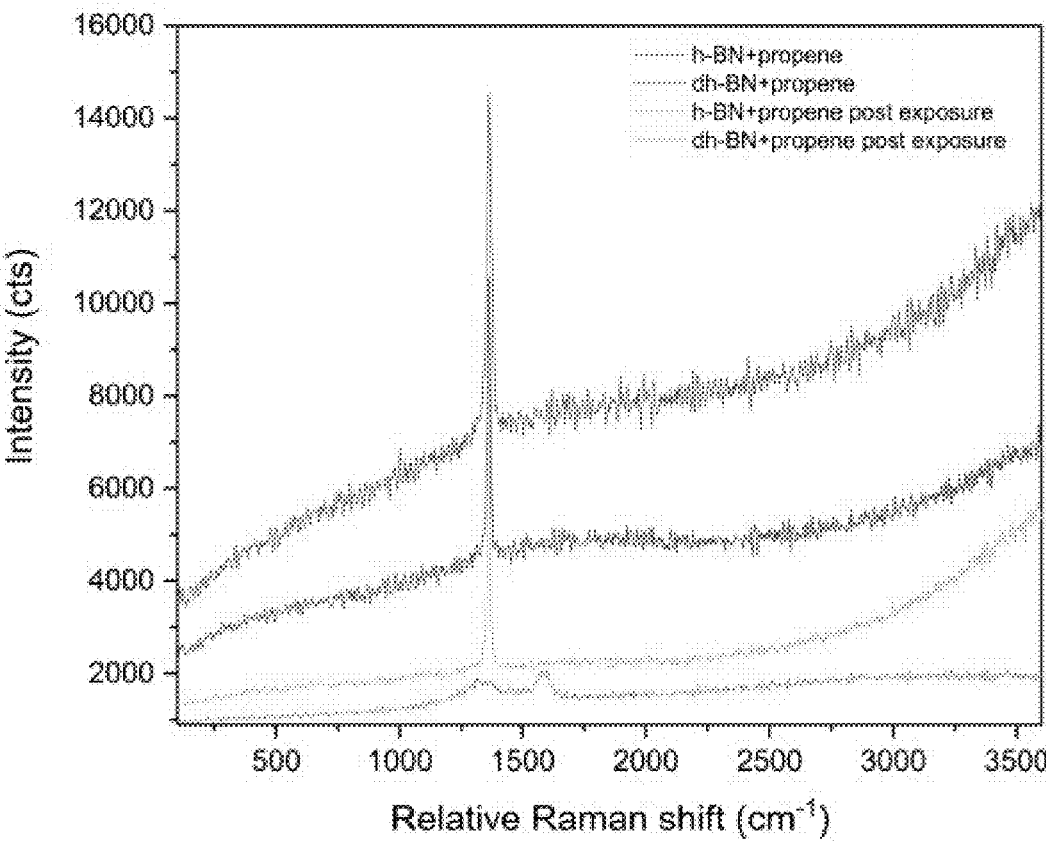
FIG. 8 is a comparison of the Raman signature of h-BN pressurized with propene before (red) and after light exposure (yellow), and dh-BN pressurized with propene before (blue) and after light exposure (green).
Figure 9:
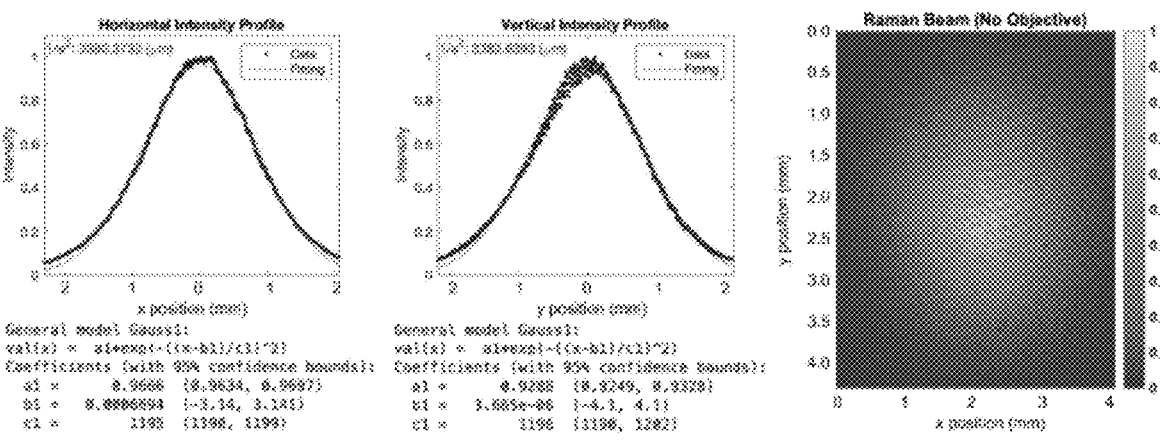
FIG. 9 is a laser beam profile showing the Gaussian shape in horizontal and vertical direction.

To investigate the properties of the newly formed carbonaceous matter on dh-BN, Raman spectra was first collected using a higher magnification objective (50× with long working distance). Representative spectra of h-BN and dh-BN, pre- and post-exposure to the 532-nm-laser light, are provided in FIG. 8. The laser beam profile displayed in FIG. 9 shows the Gaussian-like power distribution at the surface of the sample during the reaction. In the same graph, we plotted the radial profile of fluorescence maximum intensity extracted from each spectrum along the radius of the region to illustrate the luminescence change with the distance to the center of the reacted region. Accordingly, Raman spectra collected along the radial direction of the reacted region exhibited different signatures indicative of the progress of the reaction. This can be seen on the Raman map rendered by k-means cluster analysis of the spectra collected in the region, 70 μm from the center of the dark region (FIG. 6a). This variation with distance from the center indicates that the progress of the reaction (i.e., the nature of products the reaction yields as it evolves) is affected by the laser intensity. Though this is not a direct monitoring of the reaction intermediate, it reveals the different stages of the reaction. Thus, spectra collected at the periphery of the dark region exhibited very different fingerprints than those collected at the center of the region (FIG. 6). Furthermore, we found that dh-BN was affected by the photo-induced process beyond the change in color, and even beyond 200 μm from the edge in some cases. Initial analysis of the Raman spectra suggests that the center of the dark region exhibits a signal with two prominent bands around 1329 cm$^{-1}$ and 1580 cm$^{-1}$, consistent with the D and G bands of carbonaceous material, respectively. Coking and soot arise from the formation of complex carbonaceous materials commonly described as the product of incomplete combustion or dehydrogenation of hydrocarbons, and can be composed of agglomerated small particles, regions with various levels of crystallinity, and amorphous domains. Raman spectroscopy has been extensively used to characterize soot and coking products present in atmospheric, astrophysics and combustion systems, though applied deconvolution processes have a significant impact on the calculated parameters.[42] Finer analysis of Raman spectra of carbon species was performed following previously reported deconvolution procedures,[42a] using one Lorentzian line shape for the G center at ~1590 cm$^{-1}$ (representing the $E_{2g}$ mode of graphitic-like structure), and three line shapes to deconvolute the D ("defect") band centered around 1355 cm$^{-1}$ (activated by the presence of defects in the sp$^2$ aromatic network for carbon structures) as shown in FIG. 7b. The three sub-bands were labelled D1, D3 and D4 modes. D1 and D4 are related to the $A_{1g}$ symmetry of the lattice and indicate disordered graphitic lattice. D1 has been assigned to disorder at graphene layer edges while D4 is related to polyenes and impurities. D1 and D4 were fitted with Lorentzian functions. D2 was not observed in the data presented here. D2 is generally centered at ~1620 cm-1 and also indicates disordered graphitic lattice but relative to the $E_{2g}$ mode, indicative of surface graphene layers. This suggests that the crystallites are likely too small to observe this type of structural disorder. D3 is ascribed to amorphous carbon. It was fitted with a Gaussian line shape to represent the statistical distribution of the amorphous carbon in the system.

The lateral dimensions of the graphitic crystalline domains ($L_a$), the percentage of amorphous domains and the level of hydrogenated carbon were estimated from the deconvolution results. Calculation of $L_a$ from Raman spectra has been the subject of numerous works in the literature. For instance, Herdman et al. discussed two regimes to consider when calculating $L_a$ from the intensity ratio $I_D/I_G$ of D and G bands.[46] Here we use Knight and White's formula to estimate the crystallite size of graphitic domains from the area ratio of G and D1 bands $L_a$=4.4 $A_G/A_{D1}$, following previous work discussed by Je Seong et al,[42b] which showed that values obtained from this calculation were in good agreement with the size of crystallites measured by TEM.

Amorphous domains are mostly composed of polycyclic aromatic hydrocarbons (PAHs), which can serve as precursors to graphene layer growth. The amount of amorphous carbon can be estimated from the intensity ratio $I_{D3}/I_G$, though we note some reports indicating a lack of consistency with this parameter. The luminescence background is indicative of hydrogenated carbon.[47] It originates from the radiative combination of electron-hole pairs in localized states by sp$^2$ clusters. The intensity ratio $I_{PL}/I_G$ of PL signal and G band has been used to determine the variation in hydrogenated carbon content in soot. Here we estimate $I_{PL}$ by measuring the highest intensity in the spectra in the 2800-3500 cm$^{-1}$ range.

As shown in FIG. 6a, the chemical map rendered by k-means analysis of the hyperspectral map of the region, using 4 clusters, clearly shows the progression of the reaction. The fluorescence background of the spectra obtained in the reacted region increased significantly compared to the signature of dh-BN. The fluorescence was consistently the highest at the edge of the dark region (yellow spectrum in FIG. 6a). In this region, the high level of fluorescence was accompanied with the disappearance of D and G bands. The spectra exhibited features comparable to previously reported signatures of small PAHs such as anthracene.[48] Comparison of spectra collected at increasing distances from the center (Raman spectra of FIG. 6b) shows that the size of the crystallite decreases slightly from 2.5 nm at the center to 2.3 nm at 10 μm, 2.2 nm at 20 μm and 2.1 nm at 30 μm away from the center. We note the increase of a small band at 1450 cm$^{-1}$ when getting closer to the edge, corresponding to the presence of CH$_2$ groups. At 40 μm (i.e., the edge of the dark region) and beyond, the D and G bands were no longer present, similar to the blue region in FIG. 7a. This is in agreement with the estimated content of amorphous carbon of 17% at the center of the dark region and of 43% in the outer layer of the region (at 30 μm and 40 μm). From the unreacted region to the center of the dark region, one can see that hydrogenated carbon evolves into small, disordered structures, which continue to grow to form crystallites with lateral dimensions up to few nm in the condition of the experiments considered herein. We confirmed that 500 μm

Figure 10:
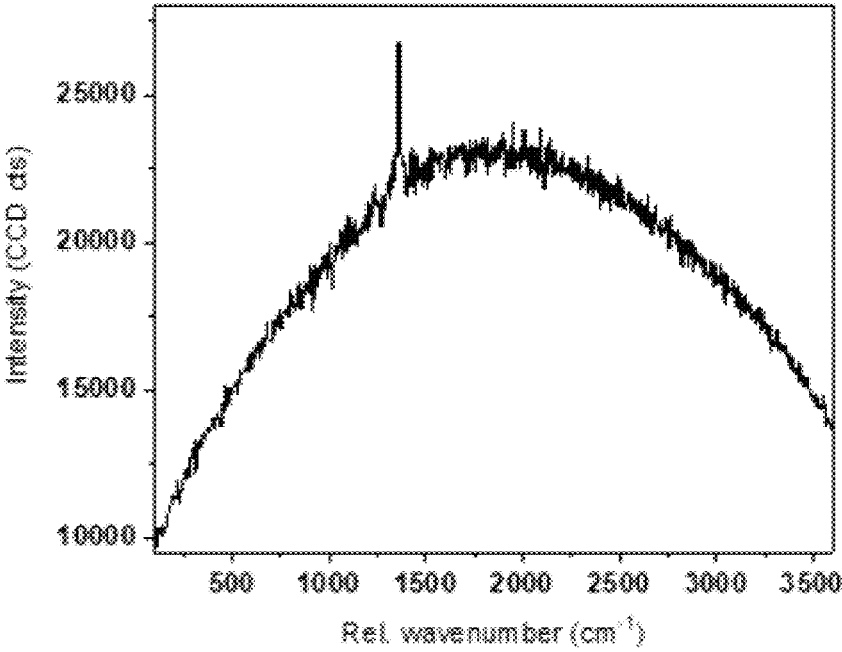
FIG. 10 shows Raman spectra of the white powder collected about 500 μm from the center of the dark region showing the signature of dh-BN is maintained some distance away.

13 away from the center of the powder, which retained its white color, the Raman signature corresponding to dh-BN was retrieved (FIG. 10).

Figure 11:
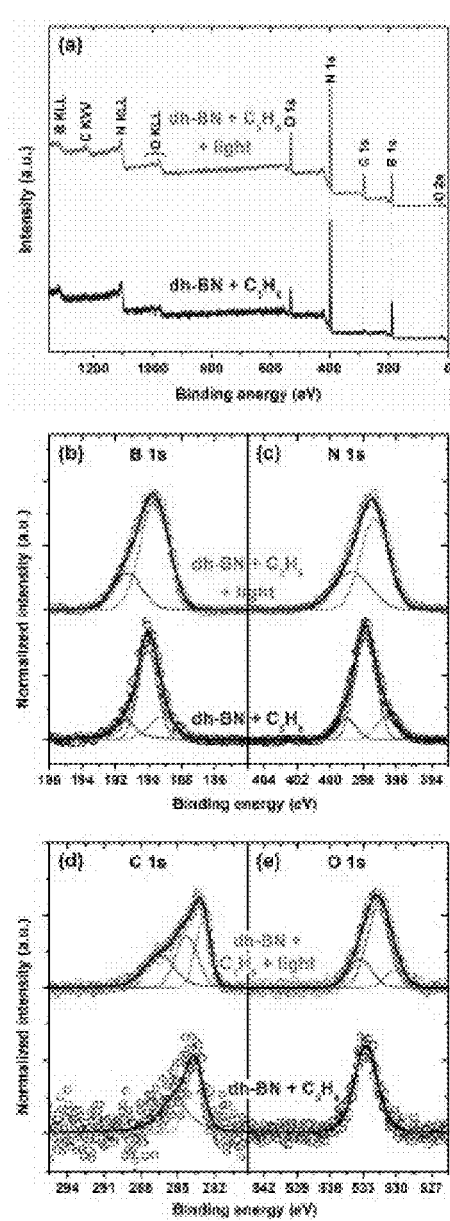
FIG. 11 shows XPS survey spectra (a) and HR spectra of B 1 s (b), N 1 s (c), C 1 s (d), and O 1 s (e) of dh-BN after exposure to propene (bottom spectra) and dh-BN exposed to propene after laser illumination (532 nm, 25 mW) for a duration of 30 min (upper spectra). The HR spectra were fitted with sums of Voigt functions (solid black lines).

The composition of the region was analyzed further with XPS. FIG. 11a shows the corresponding XPS survey spectra for propene-exposed dh-BN before and after illumination. After exposure to propene, the XPS survey spectrum is quite similar to that of dh-BN (FIG. 11a). However, the B is HR spectrum shown in FIG. 11b exhibits three peaks at 189.2, 190.1, 191.4 eV. The peak at 190.1 eV corresponds to B—N bonds associated with B—$N_3$ sites with a slight shift toward low BEs (with respect to the value of dh-BN before exposure to propene), probably due to the presence of more carbon atoms in the surrounding of B—$N_3$ groups. The peaks located at 189.2 and 191.4 eV can be ascribed to C—B—N and B—N—C chemical environments of boron, respectively.[38]

Accordingly, the N is narrow scan yields the spectrum of FIG. 11c which highlights N—B—C bonds at 396.5 eV [24] and N—B bonds at 397.9 eV in agreement with the B is spectrum. Indeed, for the propene-exposed dh-BN, the difference between the BE of this component (397.9 eV) and that ascribed to B—N bond (190.1 eV) is consistent with the value for BN which remains at about 207.7 eV.[36b] In addition, the N is spectrum shows a peak at 399.1 eV presenting a shift of +1.2 eV with respect to the N—B BE and hence can be associated to N—C bonds from N—$BC_2$ or N—$B_2C$ sites.[36a]

Figure 4:
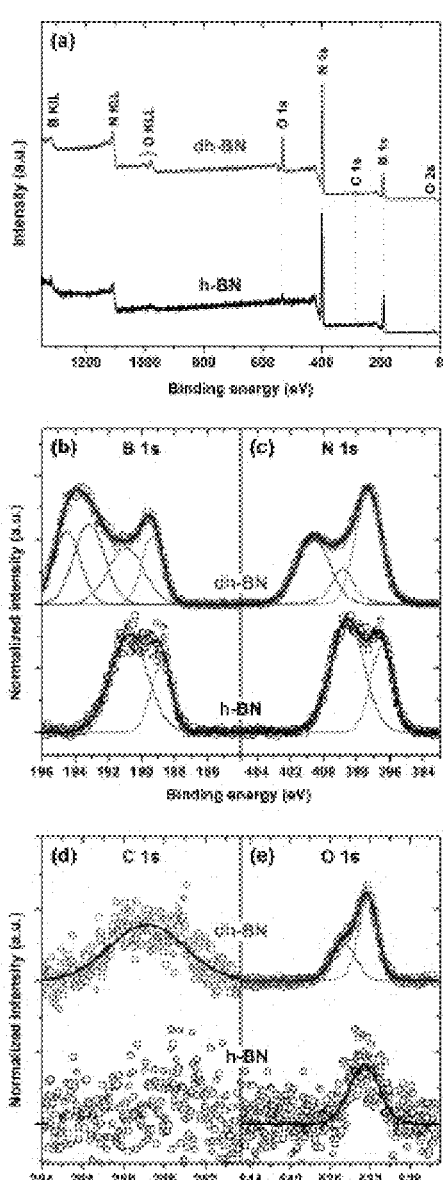
FIG. 4 shows the XPS survey spectra (a) and HR spectra of B is (b), N is (c), C is (d), and O 1 s (e) core levels for h-BN (down spectra) and milled h-BN (labeled dh-BN) obtained after 2 h of ball milling (upper spectra). The HR spectra were fitted with sums of Voigt functions (solid black lines).

The C 1 s spectrum displayed in FIG. 4d shows two major peaks located at 283.6 and 285.3 eV. The first peak (283.6 eV) corresponds to C atoms bonded to B (in agreement with the deconvolution of the B is photoelectron spectrum) while the second peak (285.3 eV) is consistent with C—N bonds (in agreement with the N is spectrum). However, the latter is quite broad (2.6 eV FWHM), which is likely the result of contributions of C—C and C—H bonds from air adsorbed contaminants. These XPS measurements evidence that the nature of the catalytic reaction under visible illumination is different from the behavior observed when dh-BN is only exposed to propene, for which the chemical environments remain similar to non-exposed dh-BN, except for the saturation of dangling bonds mainly with carbon species (from propene) instead of oxygen ones (from air). In addition, no obvious signatures of the propene were revealed by XPS for propene-exposed dh-BN, which means that such an exposure yields adsorbed propene molecules on the surface of dh-BN, which are then evacuated under the ultra-high vacuum of the XPS chamber.

After illumination of propene-exposed dh-BN using the 532-nm-laser (~25 mW), the XPS survey spectrum depicted in FIG. 12a shows a clear increase of the carbon and oxygen signatures when compared to propene-exposed dh-BN. In addition to the B—N—C peak located at 191.3 eV, the B is HR spectrum of FIG. 12b shows a prominent increase of the C—B—N peak (189.6 eV) corresponding to a larger amount of carbon atoms bonded to boron. The N 1 s HR spectrum (FIG. 11c) is composed of two major peaks located at 397.3 and 398.7 eV. The BE of the first peak (397.3 eV) is consistent with that of N—C bonds relative to the graphitic and pyridinic N atoms (N—$C_3$ and N—$C_2$ sites)[49] as well as that of N—B—C bonds which can arise from graphitic carbon bonded to BN. The second peak (398.7 eV) refers to N—B bonds of h-BN. Thus, the N is spectrum suggests that, after laser illumination, the nitrogen atoms have three different surrounding chemical environments: an environment consisting of boron atoms (i.e., N—$B_3$ sites of hexagonal BN), an environment consisting of carbon atoms (i.e., graphitic N—$C_3$ and pyridinic N—$C_2$ sites), and an environment composed of both boron and carbon atoms (i.e., N—BXCY sites).

Figure 12:
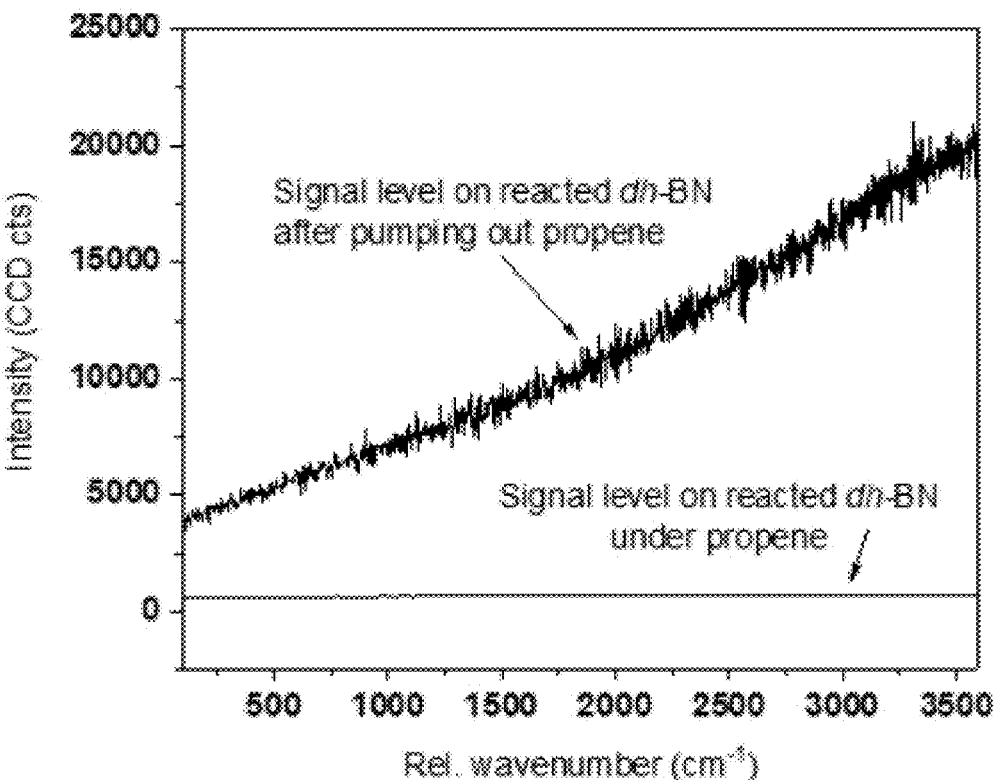
FIG. 12 shows Raman spectrum collected at the same location under propene (signal is comparatively too low to resolve the D and G features) and after pumping out propene from the chamber.

The deconvoluted C 1 s HR spectrum (FIG. 11d) highlights three features at 283, 284.3, and 286.5 eV. The first band (283 eV) originates from C—B environments, in agreement with the B 1 s photoelectron spectrum. The peak at 284.3 eV can be assigned to the C—C bonds originating from graphitic carbon (C—C3 sites in $sp^2$ graphite) [31a, 50] and most likely from a contribution of C—H bonds. The broad peak at 286.5 eV could arise from the contributions of nitrogen surrounding environments (i.e., C—N and C—N—B bonds revealed by the N is spectrum), of carbon surrounding atoms due to the C=C bonds with the $sp^2$ hybridization,[51] and of oxygen surrounding atoms corresponding to carbonyl C=O (in the range 287.4-288 eV) and hydroxyl C—O bonds (around 286.5 eV).[33, 35, 37, 51b] However, it should be noted that due to the broad width of this peak (286.5 eV) and the small corresponding carbon content, one cannot completely rule out the existence of a small contribution of $sp^2$ hybridized C=N bonds,[32b, 37] although such a contribution would be insignificant since its signature was not observed on the N is spectrum. The O 1 s HR scan (FIG. 11e) can be decomposed into three peaks: one peak located at 530.2 eV related to O=C—C bonds and which is described as a characteristic peak of quinone oxygen,[52] a second peak located at 531.7 eV which can be ascribed to O=C bonds, and a third peak at 533.3 eV which can be attributed to O—C bonds of hydroquinone and O—H bonds of hydroquinone and adsorbed water. As mentioned above, the oxygen species predominantly result from exposure to air during sample transfer to the XPS chamber. Thus, the formation of C=O and C—OH bonds is an indication of the existence of carbon defect atoms (C*) within the formed graphitic domains prior to exposure of samples to air. Indeed, these carbon defects bring about the emergence of C—C* bonds with a peak located at about 285.5 eV.[32b, 53] This is confirmed by observations made in Raman confocal spectroscopy (FIG. 12). Thus, XPS measurements of illuminated propene-exposed dh-BN clearly confirm the results of the Raman study exposed above since they revealed an averaged signature of the different intermediate products of the reaction (that were locally probed with Raman spectroscopy). The identified quinone compounds suggests that the light-induced activation of propene dehydrogenation upon dh-BN defects brings about the formation of benzene-like molecules with carbon defect sites. As a result, the unsaturated benzene molecules form growing PAHs exhibiting enhanced photoluminescence, which in turn yield the formation of carbon domains for which the Raman spectra show a decreasing fluorescence background and more resolved G and D graphitic bands as the distance to the reaction center decreases.

Figure 13:
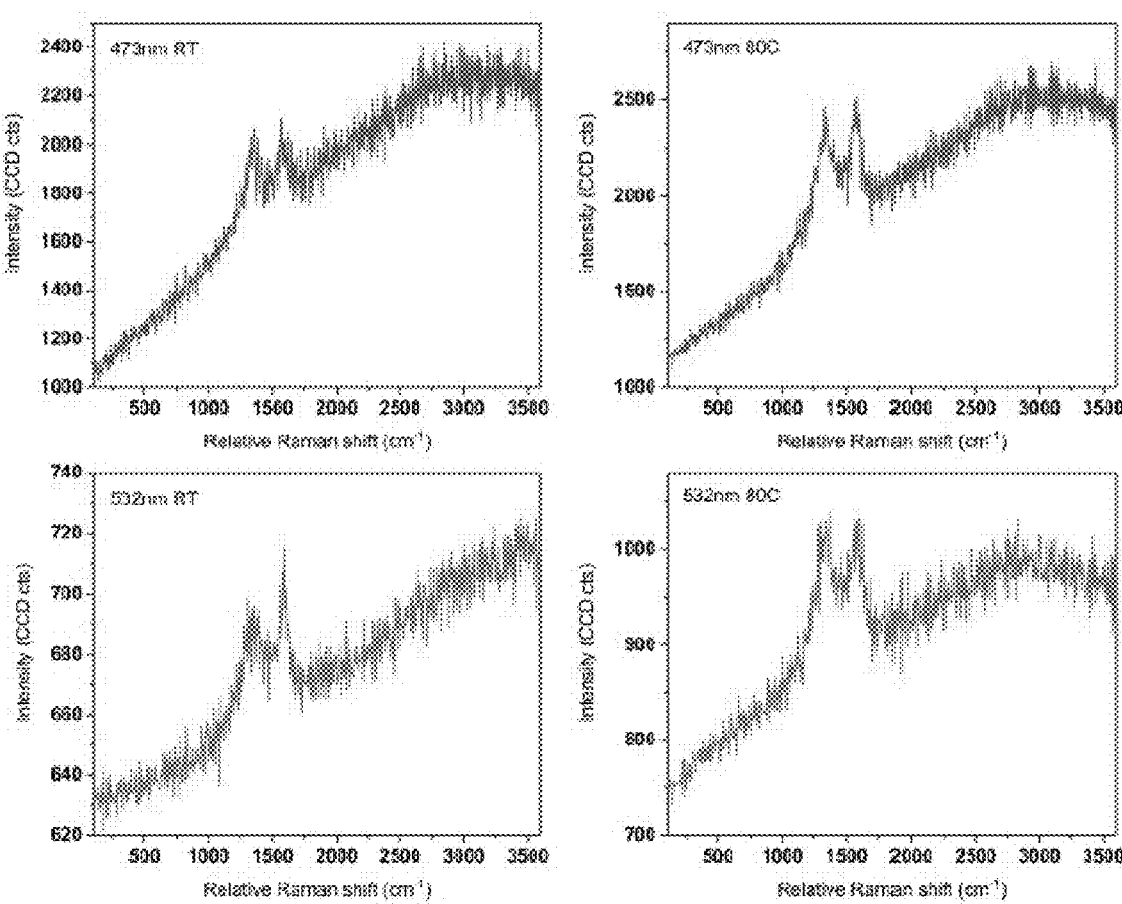
FIG. 13 shows the role of temperature on the reactions observed under 473 nm and 532 nm illumination.

The reaction site is affected by laser exposure time and that increasing the laser power allows the reactions to progress faster with slightly increased area of the dark region, and more intense D and G bands at the center of the area. For instance, the formation of soot was observed in a few minutes when illuminating the powder with the 532-nm-light at a power of 100 mW focused on the sample with a 10× objective compared to about 30 to 60 min with 25 mW. Without focusing the light, the formation of soot could not be observed, even after overnight exposure. This suggests that a threshold fluence of photons is needed to enable the photocatalytic reaction. On the other hand, the reaction can be activated at 532 nm or 473 nm illumination corresponding to an excitation above 2.33 eV (FIG. 13), whereas no sign of reaction was observed under 633, 785 or 1024 nm illuminations (i.e., for excitations below 2 eV). This indicates that the reaction also requires a sufficient photon energy to occur (the energy threshold is then between 2 and 2.33 eV). These findings suggest that the catalytic reaction might consist of a multiple-photons (two photons at least) assisted process for which transformations have activation energies above 2 eV. Increasing the temperature of the chamber to 80° C. reduced the time it took for the reaction to occur to ~10 min, but the Raman signature of the center of the dark region was similar to that of the reaction carried out at room temperature (24° C.) (FIG. 13).

Figure 14:
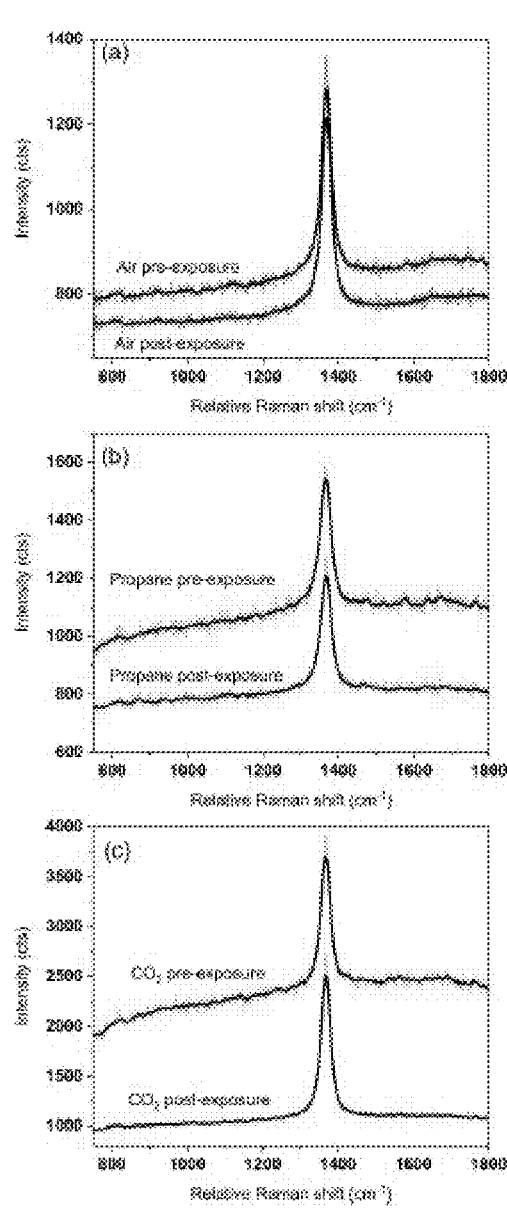
FIG. 14 shows Raman spectra pre- and post-exposure of dh-BN to laser illumination (532 nm, 25 mW) under air (a), propane (b), and $CO_2$ (c).
Figure 15:
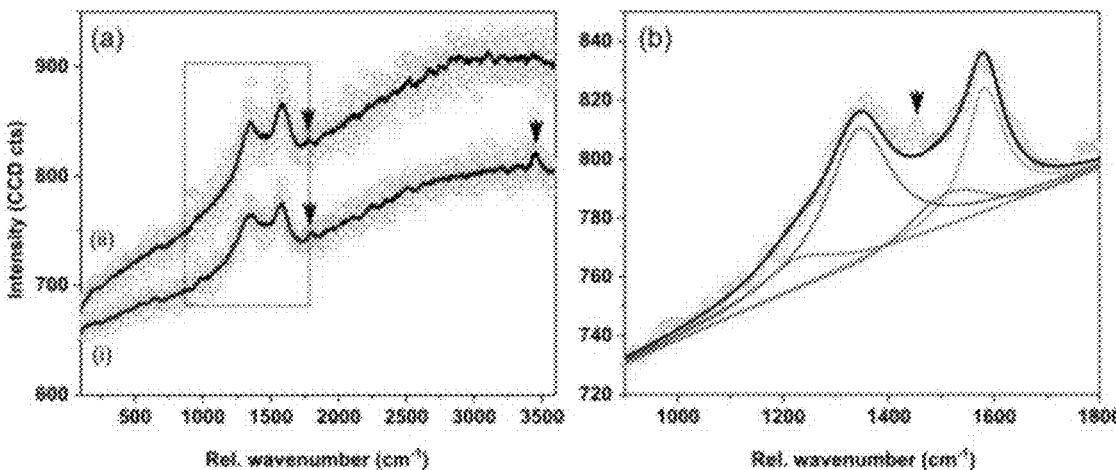
FIG. 15 shows Raman spectra collected in the dark region formed after illumination at 532 nm of dh-BN under CO atmosphere. (a) Two spectra collected at the center (i) and slightly off-center (ii) in the dark region. The presence of additional bands at 1795 $cm^{-1}$ (C═O) and 3460 $cm^{-1}$ (O—H) are marked by black arrows. (b) Analysis of the 900-1800 $cm^{-1}$ region of the spectra containing the D and G bands of the carbonaceous material using deconvolution with the D1, D3, D4 and G bands as detailed in Table 2. The presence of an additional band at 1450 $cm^{-1}$ (the black arrow).
Figure 16:
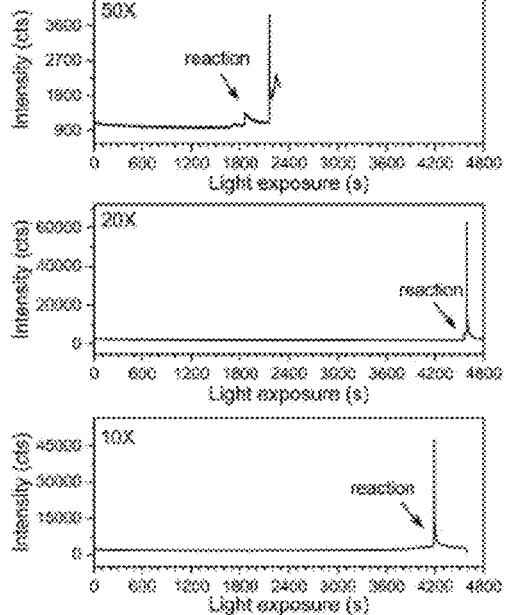
FIG. 16 shows the effect of light magnification of the time required for the formation of the carbonaceous material exhibiting the Raman bands described in FIG. 4. Highest magnification (50× objective) decreased the time in half. Magnification also impacts the dimension of the dark area.

Evaluation of the photoreactive behavior of dh-BN in presence of other molecules. Different gaseous environments were considered to examine the conditions of the photo-induced process. First, exposing dh-BN to air prior to the pressurizing with propene prevented the reaction (FIG. 14a). The absence of reaction with propene in this case confirmed that one or more of the molecules in air passivate the reactive defects, as proposed by Nash et al.[15] Next, we studied the effect of replacing propene by propane (FIG. 14b), CO2 (FIG. 14c), and CO (FIG. 15). Propane is the alkane counterpart to propene, and has been shown to undergo oxidative dehydrogenation in catalytic processes promoted by h-BN.[13a, 41b, 54] However, within the conditions investigated, no significant change in the h-BN or dh-BN Raman signatures was observed when pressurizing the reaction chamber with propane followed by 532-nm-illumination. This confirms that our process is selective for the activation of unsaturated $sp^2$ carbon-carbon bonds and not towards oxidative dehydrogenation reactions at $sp^3$ carbons. Interestingly, CO yields interactions similar to the ones observed in presence of propene (FIG. 16). Raman spectra of the region confirmed the formation of a carbonaceous material at the site of illumination with characteristic D and G bands in the 1000-1800 cm-1 range. Two small bands at 1795 cm-1 and 3460 cm-1, indicative of $C{=}O$ and O—H stretching vibrations, respectively, suggest the formation of carboxylic acid, though the signal is much lower in intensity than that for the soot-like material. Deconvolution of the Raman bands (FIG. 15) indicates graphitic domains with dimensions $L_a$~2.5 nm at the center of the area. Amorphous carbon was estimated at 27%. We note the presence of hydrogen in the Raman band assignment which indicates residual hydrogen in dh-BN despite our best efforts to control the environment. Under the same conditions, $CO_2$ did not display the same reaction to light, with no detectable D or G band forming at the illuminated site and no color change of the powder.

In view of the results, one can reasonably assume that ball milling of h-BN forms point defects (nitrogen vacancies) and "poly-vacancies areas" (peeled off parts that were detached from the BN sheet under ball milling). Thus, upon exposure to air, oxygen bonds preferentially to boron atoms in the VN sites or in the B-terminated edges of poly-vacancies areas,[17] which gives rise to B—O—B and B—OH bonds, in turn preventing any reaction with propene or CO. However, when maintaining inert environments, milling-induced defects in h-BN act as reaction sites for propene, activating $C{=}C$ under visible light. After initially stimulating the dehydrogenation of propene, products including poly(alkene) compounds (e.g. poly(propene)) or defects-containing benzene-like compounds form, in agreement with recent work by Schulz et al,[55] and continue to grow yielding graphitic domains (possibly inserted in BN).

In addition, the photocatalytic reaction was shown to be laser-power- and wavelength-dependent. Thus, this reaction is most probably the result of two (or more) transformations involving the absorption of two (or more) photons, with sufficient energy (above 2 eV). Increasing the laser power corresponds to increasing the incoming photons flux. This was further validated by changing the objectives from 10× or 20× to 50×, which yields faster reactions (FIG. 16). We infer that the first transformation occurs after the absorption of the first photon and generates an intermediate product with a given lifetime. If a second photon is absorbed within this duration (i.e., within the intermediate product lifetime), the following transformation takes place, and such a sequential multiple-photon-assisted process generates the final carbonaceous product.

Example 3

The conversion of hydrocarbons is important for numerous applications, including the petroleum and bio-based industries. Methane is also a hydrocarbon that can be captured and converted with the process described here. A catalyst with high boron content was produced through chemical etching of aluminum diboride ($AlB_2$) at ambient temperature. The material produced had a reduced aluminum content. X-ray fluorescence analysis indicated a composition of $AlB_{6.5}$. The boron produced was non-equilibrium 2-dimensional boron in a puckered hexagonal structure. This resultant catalyst was active for methane dehydrogenation under 405 nm light illumination with only hydrogen and carbon realized.

One embodiment provides a new way to use visible light to activate a chemical reaction without the need for noble metals. The system presented constitutes a heterogeneous catalyst as the catalyst is the solid phase and the reactant is in gas phase. The products of the reaction of hydrocarbons with the catalyst include a gas that is being released together with the formation of a carbonaceous structures on the catalyst, all at low temperature.

Production of hydrogen from methane is currently the major commercial source of hydrogen and occurs through a steam reformation and water gas shift chemistry. In this process, in which steam and methane are reacted at high temperatures to produce hydrogen and carbon dioxide. Which produces gray hydrogen unless the resulting $CO_2$ is captured. This process is energy intensive and requires high temperatures (800-950° C.) and pressures (up to 100 atm).

$$CH_4 + 2H_2O \rightarrow 3H_2 + CO_2 \qquad (1)$$

In contrast, this catalyst enables production of hydrogen from methane without the concomitant production of $CO_2$ and pressures as low as atmospheric and temperatures below 300° C.

$$CH_4 + h\nu \rightarrow 2H_2 + C \qquad (2)$$

Since $CO_2$ is not produced, the embodiment enables the production of blue and green hydrogen without the need for costly carbon-capture technologies.

Figure 18:
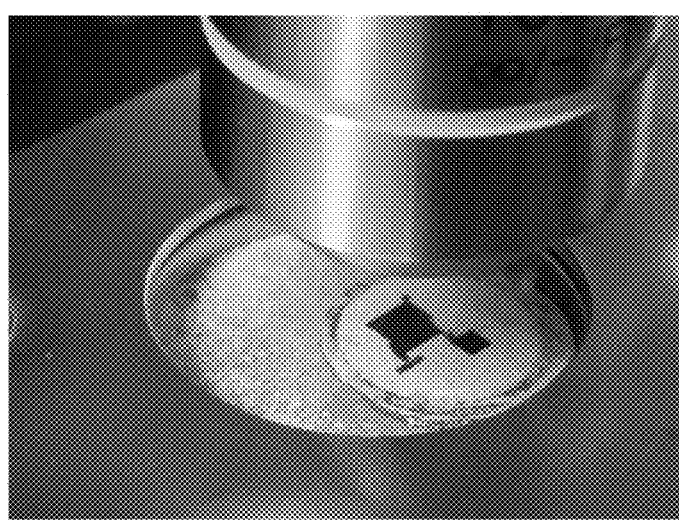
FIG. 18 shows focused laser irradiation (top) and solar (bottom) both enable hydrogen and carbon production over defect-laden boron nitride and boron rich materials.
Figure 18:
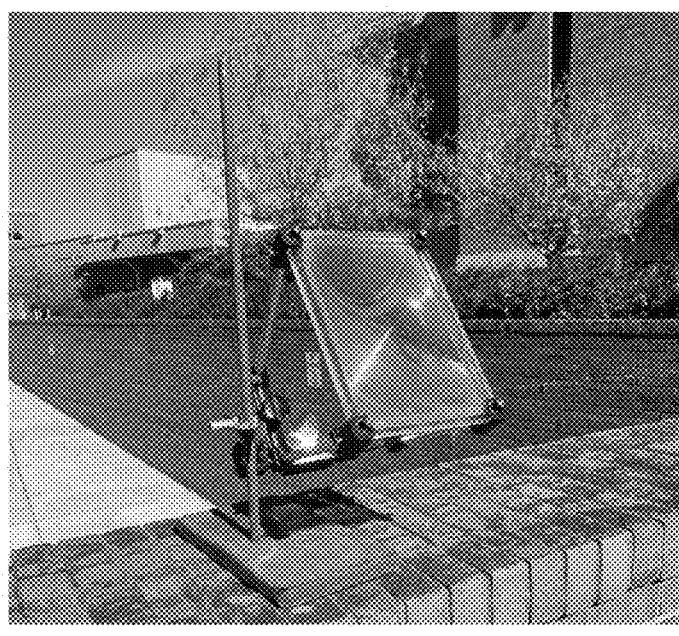

Importantly, the observed catalytic activity is realized through the implementation of compositionally diverse boron-containing solids. In one aspect of the disclosure, hexagonal boron nitride is subjected to high compressive and shear force under an inert atmosphere. This produces vacancy defects in the structure (activation). The resulting material exhibits photocatalytic activity for propene, propyne, allene, and cyclohexene reductive dehydrogenation under illumination from the following sources:

1) 532 focused laser light at 20 and 100 mW (FIG. 18)
2) 405 nm focused laser light at 350 mW (FIG. 18)

Figure 20:
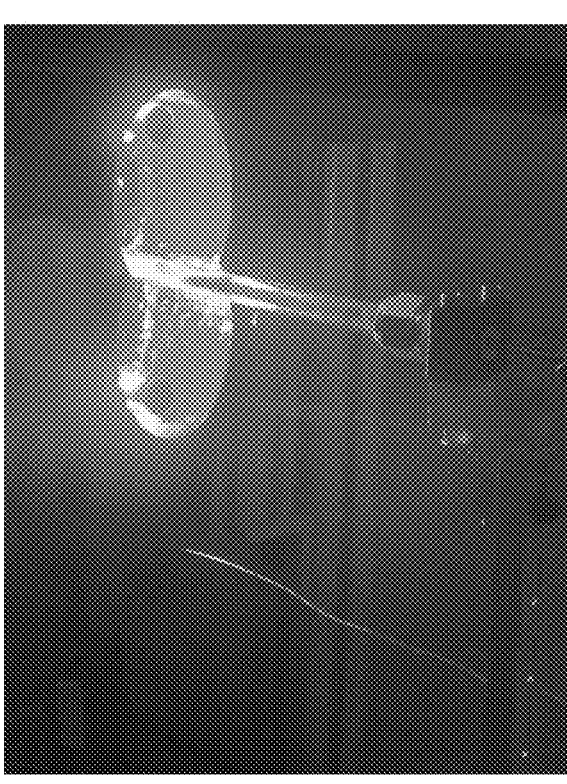
FIG. 20 shows a dual elliptical reactor with HID lamp illumination (example 4) producing carbon and hydrogen in a flow configuration. The image has a green filter to reduce the intensity and allow image capture.
Figure 21:
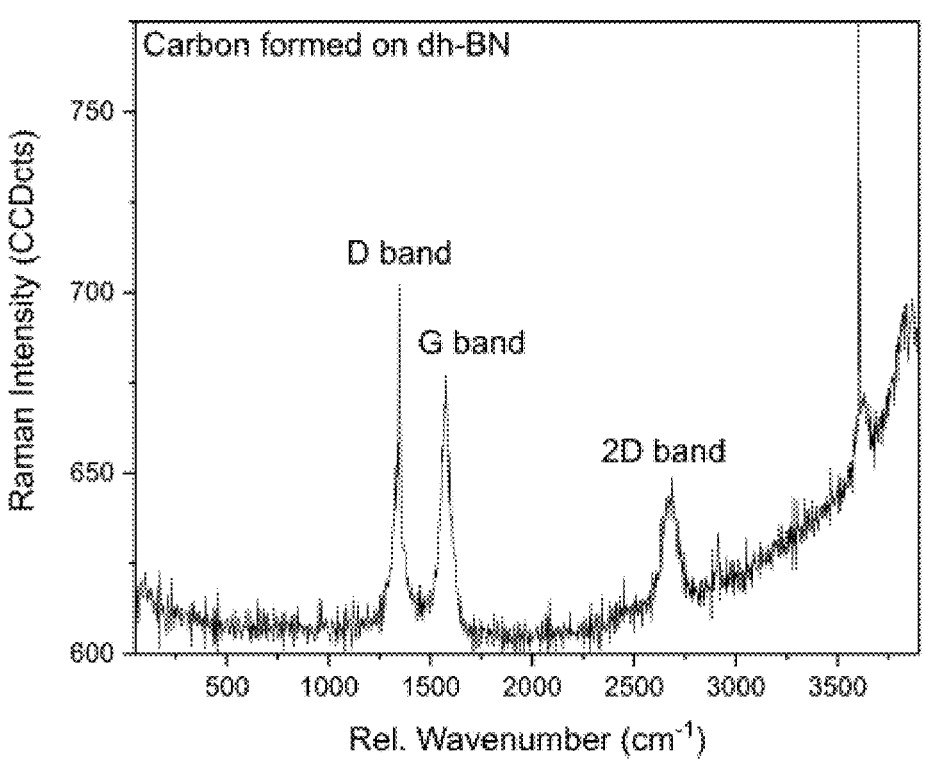
FIG. 21 shows the carbon formation showing the presence of D and G bands, indicative of the presence of small graphitic domains. (top) signature obtained on the carbon formed from the reaction on dh-BN under methane atmosphere with a laser illumination at 405 nm. (bottom) signature obtained on the carbon formed from the reaction on low-dimensional Boron under methane atmosphere with a laser illumination at 405 nm.
Figure 21:
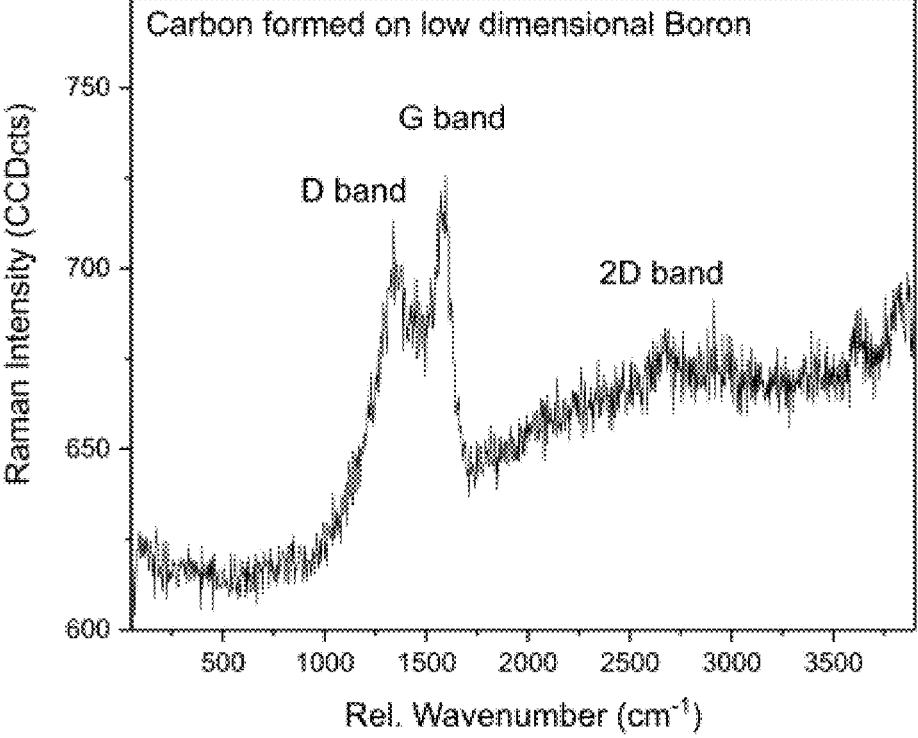

3) 265 nm illumination with an array of UV LEDs producing 640 mW of light 4) 20000 lumen illumination from high intensity discharge lamps with a color temperature of 8000K (FIG. 20)

5) Solar irradiation focused to a 1 cm$^2$ spot by a 7"×9" Fresnel lens (FIG. 18)

6) Solar irradiation focused to a 4 cm$^2$ spot by a 24"×36" Fresnel lens (FIG. 18)

In another aspect of the disclosure, aluminum diboride is chemically etched to produce a highly defective boron-rich catalyst. The resulting material exhibits photocatalytic activity for methane reductive dehydrogenation under illumination from the following sources:

1) 405 nm focused laser light at 350 mW

Figure 17:
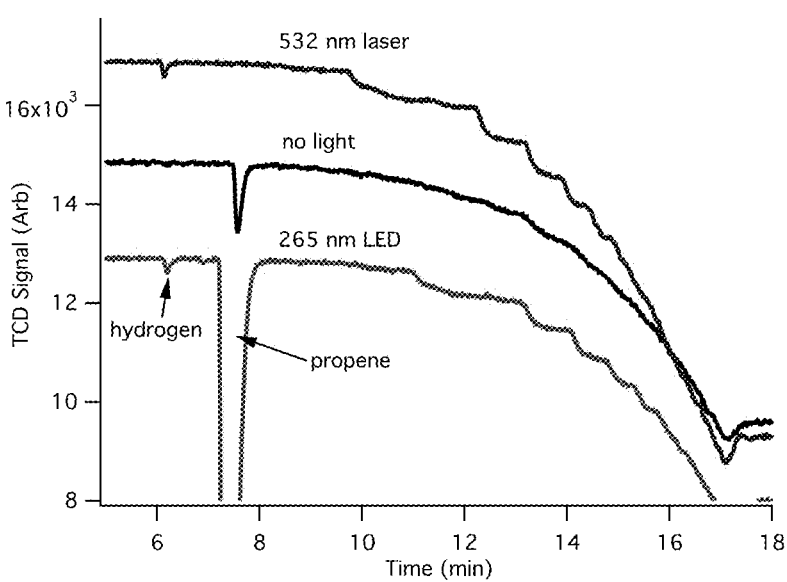
FIG. 17 show Chromatograms from gas sampled from sources 1 and 3 as well as a control. Samples were analyzed by gas chromatography with thermal conductivity detection and argon as a carrier gas.
Figure 19:
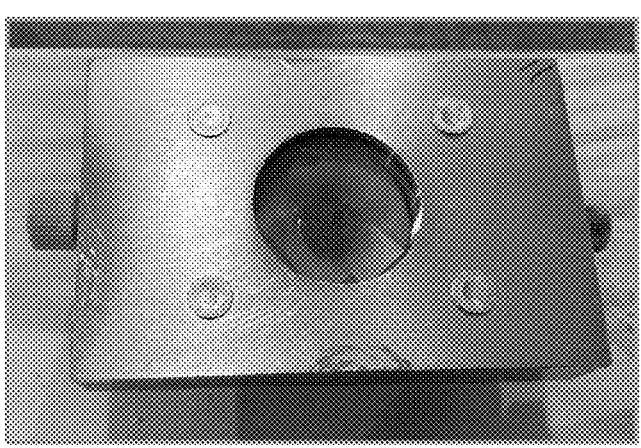
FIG. 19 shows the carbon formed by the solar light catalyzed dehydrogenation of methane.

Carbon formation was observed all but case 3 (FIG. 19, 21). Hydrogen was measured by gas chromatography (FIG. 17) with thermal conductivity detection in all cases. Additionally, hydrogen production was observed to be dependent on illumination in case 2 with hydrogen measured by a chemoresistive sensor. Hydrogen production ceased when laser was turn off and resumed when the laser was turn on again.

In another measurement, low dimensionality boron was produced by chemically etching aluminum from aluminum diboride ($AlB_2$) The produced a material enriched in boron with small amounts of aluminum remaining. Etching can be realized by reaction with halogens, alkali metal bases, or strong acids.

REFERENCES

[1] A. K. Geim, K. S. Novoselov, *Nature Materials* 2007, 6, 183.

[2] a) C. E. Banks, D. A. C. Brownson, *2D Materials: Characterization, Production and Applications*, CRC Press, Taylor & Francis Group, 2018; b) H. Zhang, H.-M. Cheng, P. Ye, *Chemical Society Reviews* 2018, 47, 6009; c) M. M. Islam, D. Dev, A. Krishnaprasad, L. Tetard, T. Roy, *Scientific Reports* 2020, 10, 21870.

[3] a) V. Babenko, G. Lane, A. A. Koos, A. T. Murdock, K. So, J. Britton, S. S. Meysami, J. Moffat, N. Grobert, *Scientific Reports* 2017, 7, 14297; b) L. Song, L. Ci, H. Lu, P. B. Sorokin, C. Jin, J. Ni, A. G. Kvashnin, D. G. Kvashnin, J. Lou, B. I. Yakobson, P. M. Ajayan, *Nano Letters* 2010, 10, 3209.

[4] S. Manzeli, D. Ovchinnikov, D. Pasquier, O. V. Yazyev, A. Kis, *Nature Reviews Materials* 2017, 2, 17033.

[5] F.-f. Zhu, W.-j. Chen, Y. Xu, C.-l. Gao, D.-d. Guan, C.-h. Liu, D. Qian, S.-C. Zhang, J.-f. Jia, *Nature Materials* 2015, 14, 1020.

[6] a) E. Pomerantseva, Y. Gogotsi, *Nature Energy* 2017, 2, 17089; b) D. Deng, K. S. Novoselov, Q. Fu, N. Zheng, Z. Tian, X. Bao, *Nature Nanotechnology* 2016, 11, 218.

[7] R. Kurapati, K. Kostarelos, M. Prato, A. Bianco, *Advanced Materials* 2016, 28, 6052.

[8] a) C. Choi, Y. Lee, K. W. Cho, J. H. Koo, D.-H. Kim, *Accounts of Chemical Research* 2019, 52, 73; b) F. Yi, H. Ren, J. Shan, X. Sun, D. Wei, Z. Liu, *Chemical Society Reviews* 2018, 47, 3152.

[9] G. Konstantatos, *Nature Communications* 2018, 9, 5266.

[10] J. Xiong, J. Di, J. Xia, W. Zhu, H. Li, *Advanced Functional Materials* 2018, 28, 1801983.

[11] a) A. Eckmann, A. Felten, A. Mishchenko, L. Britnell, R. Krupke, K. S. Novoselov, C. Casiraghi, *Nano Letters* 2012, 12, 3925; b) S. Wang, A. Robertson, J. H. Warner, *Chemical Society Reviews* 2018, 47, 6764.

[12] a) J. Dang, S. Sun, X. Xie, Y. Yu, K. Peng, C. Qian, S. Wu, F. Song, J. Yang, S. Xiao, L. Yang, Y. Wang, M. A. Rafiq, C. Wang, X. Xu, *npj 2D Materials and Applications* 2020, 4, 2; b) M. E. Turiansky, A. Alkauskas, C. G. Van de Walle, *Nature Materials* 2020, 19, 487.

[13] a) P. Chaturbedy, M. Ahamed, M. Eswaramoorthy, *ACS Omega* 2018, 3, 369; b) Y. Ding, F. Torres-Davila, A. Khater, D. Nash, R. Blair, L. Tetard, *MRS Communications* 2018, DOI: 10.1557/mrc.2018.1131; c) F. Ling, X. Liu, H. Jing, Y. Chen, W. Zeng, Y. Zhang, W. Kang, J. Liu, L. Fang, M. Zhou, *Physical Chemistry Chemical Physics* 2018, 20, 26083; d) D. Voiry, H. S. Shin, K. P. Loh, M. Chhowalla, *Nature Reviews Chemistry* 2018, 2, 0105; e) L. Zhang, X. Ji, X. Ren, Y. Ma, X. Shi, Z. Tian, A. M. Asiri, L. Chen, B. Tang, X. Sun, *Advanced Materials* 2018, 30, 1800191.

[14] X. Li, H. Zhu, *Journal of Materiomics* 2015, 1, 33.

[15] D. J. Nash, D. T. Restrepo, N. S. Parra, K. E. Giesler, R. A. Penabade, M. Aminpour, D. Le, Z. Li, O. K. Farha, J. K. Harper, T. S. Rahman, R. G. Blair, *ACS Omega* 2016, 1, 1343.

[16] K. L. Chagoya, D. J. Nash, T. Jiang, D. Le, S. Alayoglu, K. B. Idrees, X. Zhang, O. K. Farha, J. K. Harper, T. S. Rahman, R. G. Blair, *ACS Sustainable Chemistry & Engineering* 2021, 9, 2447.

[17] J. Zhang, R. Sun, D. Ruan, M. Zhang, Y. Li, K. Zhang, F. Cheng, Z. Wang, Z.-M. Wang, *Journal of Applied Physics* 2020, 128, 100902.

[18] G. Natarajan, F. Caballero-Briones, S. K. Kamaraj, in *Green Photocatalysts for Energy and Environmental Process. Environmental Chemistry for a Sustainable World*, Vol. 36 (Eds: S. Rajendran, M. Naushad, L. Ponce, E. Lichtfouse), Springer, Cham 2019.

[19] J. Li, N. Lei, L. Guo, Q. Song, Z. Liang, *ChemElectroChem* 2018, 5, 300.

[20] L. Jiang, X. Yuan, G. Zeng, Z. Wu, J. Liang, X. Chen, L. Leng, H. Wang, H. Wang, *Applied Catalysis B: Environmental* 2018, 221, 715.

[21] M. Ji, J. Xia, J. Di, Y. Liu, R. Chen, Z. Chen, S. Yin, H. Li, *Chemical Engineering Journal* 2018, 331, 355.

[22] D. Liu, M. Zhang, W. Xie, L. Sun, Y. Chen, W. Lei, *Applied Catalysis B: Environmental* 2017, 207, 72.

[23] Y. Guo, R. Wang, P. Wang, L. Rao, C. Wang, *ACS Applied Materials & Interfaces* 2018, 10, 4640.

[24] Q. Liu, C. Chen, M. Du, Y. Wu, C. Ren, K. Ding, M. Song, C. Huang, *ACS Applied Nano Materials* 2018, 1, 4566.

[25] J. Wang, F. Ma, M. Sun, *RSC Advances* 2017, 7, 16801.

[26] T. Ungar, H. Mughrabi, D. Ronnpagel, M. Wilkens, *Acta Metallurgica* 1984, 32, 333.

[27] B. D. Cullity, *Elements of x-ray diffraction*, Addison-Wesley Publishing Company, Inc., Reading, M A 1978.

[28] S. Han, G. Lian, X. Zeng, Z. Cao, Q. Wang, D. Cui, C.-P. Wong, *Nano Research* 2020, 13, 3261.

[29] P. M. Sudeep, S. Vinod, S. Ozden, R. Sruthi, A. Kukovecz, Z. Konya, R. Vajtai, M. R. Anantharaman, P. M. Ajayan, T. N. Narayanan, *RSC Advances* 2015, 5, 93964.

[30] J. F. Moulder, J. Chastain, *Handbook of X-ray Photoelectron Spectroscopy: A Reference Book of Standard Spectra for Identification and Interpretation of XPS Data*, Physical Electronics Division, Perkin-Elmer Corporation, 1992.

[31] a) G. Puyoo, F. Teyssandier, R. Pailler, C. Labrugère, G. Chollon, *Carbon* 2017, 122, 19; b) J. Qu, Q. Li, C. Luo, J. Cheng, X. Hou, *Coatings* 2018, 8, 214; c) J. Li, J. Li, Y. Yin, Y. Chen, X. Bi, *Nanotechnology* 2013, 24, 365605.

[32] a) S. Jacques, A. Guette, F. Langlais, X. Bourrat, *Journal of Materials Science* 1997, 32, 2969; b) M. F. Genisel, M. N. Uddin, Z. Say, M. Kulakci, R. Turan, O. Gulseren, E. Bengu, *Journal of Applied Physics* 2011, 110, 074906.

[33] S. Wang, X. Xing, X. Zhang, X. Wang, X. Jing, *Journal of Materials Chemistry A* 2018, 6, 10868.

[34] S. S. Chng, M. Zhu, J. Wu, X. Wang, Z. K. Ng, K. Zhang, C. Liu, M. Shakerzadeh, S. Tsang, E. H. T. Teo, *Journal of Materials Chemistry C* 2020, 8, 4421.

[35] A. J. Marsden, P. Brommer, J. J. Mudd, M. A. Dyson, R. Cook, M. Asensio, J. Avila, A. Levy, J. Sloan, D. Quigley, G. R. Bell, N. R. Wilson, *Nano Research* 2015, 8, 2620.

[36] a) F. Saugnac, F. Teyssandier, A. Marchand, *Journal of the American Ceramic Society* 1992, 75, 161; b) L. Hou, Z. Chen, X. Liu, Y. Gao, G. Jia, *Applied Surface Science* 2012, 258, 3800.

[37] J. Yun, L. Chen, X. Zhang, J. Feng, L. Liu, *Polymers* 2016, 8, 35.

[38] C. Gómez-Aleixandre, A. Essafti, J. M. Albella, *The Journal of Physical Chemistry B* 2000, 104, 4397.

[39] Y. Cao, R. Zhang, T. Zhou, S. Jin, J. Huang, L. Ye, Z. Huang, F. Wang, Y. Zhou, *ACS Applied Materials & Interfaces* 2020, 12, 9935.

[40] T. Jiang, D. Le, T. B. Rawal, T. S. Rahman, *Physical Chemistry Chemical Physics* 2021, 23, 7988.

[41] a) J. T. Grant, C. A. Carrero, F. Goeltl, J. Venegas, P. Mueller, S. P. Burt, S. E. Specht, W. P. McDermott, A. Chieregato, I. Hermans, *Science* 2016, 354, 1570; b) J. T. Grant, W. P. McDermott, J. M. Venegas, S. P. Burt, J. Micka, S. P. Phivilay, C. A. Carrero, I. Hermans, *ChemCatChem* 2017, 9, 3623; c) A. M. Love, B. Thomas, S. E. Specht, M. P. Hanrahan, J. M. Venegas, S. P. Burt, J. T. Grant, M. C. Cendejas, W. P. McDermott, A. J. Rossini, I. Hermans, *Journal of the American Chemical Society* 2019, 141, 182; d) J. Tian, J. Tan, M. Xu, Z. Zhang, S. Wan, S. Wang, J. Lin, Y. Wang, *Science Advances* 2019, 5, eaav8063.

[42] a) A. Sadezky, H. Muckenhuber, H. Grothe, R. Niessner, U. Pöschl, *Carbon* 2005, 43, 1731; b) H. J. Seong, A. L. Boehman, *Energy & Fuels* 2013, 27, 1613.

[43] a) A. Cuesta, P. Dhamelincourt, J. Laureyns, A. Martínez-Alonso, J. M. D. Tascón, *Carbon* 1994, 32, 1523; b) M. S. Dresselhaus, G. Dresselhaus, *Advances in Physics* 1981, 30, 139.

[44] a) S. K. Sze, N. Siddique, J. J. Sloan, R. Escribano, *Atmospheric Environment* 2001, 35, 561; b) B. Dippel, H. Jander, J. Heintzenberg, *Physical Chemistry Chemical Physics* 1999, 1, 4707; c) B. Dippel, J. Heintzenberg, *Journal of Aerosol Science* 1999, 30.

[45] T. Jawhari, A. Roid, J. Casado, *Carbon* 1995, 33, 1561.

[46] J. D. Herdman, B. C. Connelly, M. D. Smooke, M. B. Long, J. H. Miller, *Carbon* 2011, 49, 5298.

[47] a) Rusli, J. Robertson, G. A. J. Amaratunga, *Journal of Applied Physics* 1996, 80, 2998; b) C. Casiraghi, F. Piazza, A. C. Ferrari, D. Grambole, J. Robertson, *Diamond and Related Materials* 2005, 14, 1098.

[48] E. Cloutis, P. Szymanski, D. Applin, D. Goltz, *Icarus* 2016, 274, 211.

[49] a) K. H. Leong, P. F. Lim, L. C. Sim, V. Punia, S. Pichiah, *Applied Surface Science* 2018, 430, 355; b) S. Ji, Y. Yang, X. Li, H. Liu, Z. Zhou, *Nanomaterials* 2020, 10, 676.

[50] L. Xu, J. Wu, S. Bai, *Carbon* 2012, 50, 4705.

[51] a) H. A. Mannan, H. Mukhtar, T. Murugesan, R. Nasir, D. F. Mohshim, A. Mushtaq, *Chemical Engineering &*

*Technology* 2013, 36, 1838; b) A. Malas, A. Bharati, O. Verkinderen, B. Goderis, P. Moldenaers, R. Cardinaels, *Polymers* 2017, 9, 613.

[52] R. Zhang, W. Wan, L. Qiu, Y. Wang, Y. Zhou, *Applied Surface Science* 2017, 419, 342.

[53] H. Estrade-Szwarckopf, *Carbon* 2004, 42, 1713.

[54] J. A. Loiland, Z. Zhao, A. Patel, P. Hazin, *Industrial & Engineering Chemistry Research* 2019, 58, 2170.

[55] F. Schulz, M. Commodo, K. Kaiser, G. De Falco, P. Minutolo, G. Meyer, A. D'Anna, L. Gross, *Proceedings of the Combustion Institute* 2019, 37, 885.

[56] S. Doniach, M. Sunjic, *Journal of Physics C: Solid State Physics* 1970, 3, 285.

What is claimed is:

1. A method for of making hydrogen without carbon release in gas form, the method comprising the steps of: (i) forming a reaction mixture by contacting a heterogeneous catalyst comprising at least hexagonal boron nitride with a hydrocarbon source in a chamber, and (ii) focusing a light source on the reaction mixture under conditions that result in formation a carbon structure and hydrogen gas.

2. The method of claim 1, wherein the hexagonal boron nitride heterogeneous catalyst further comprises at least one or more catalytically active defect is selected from the group consisting of Stone-Wales defects, B/N defects, boron substituted nitrogen, nitrogen substituted for boron, carbon substituted for nitrogen, carbon substituted for boron, boron vacancy, nitrogen vacancy, and combinations thereof.

3. The method of any of claim 1, wherein the heterogeneous catalyst is substantially free of metals, (ii) wherein the hydrocarbon source is selected from a group comprising of methane, ethane, propene, allene, propyne, cyclohexene (iii) wherein the chamber is pressurized up to 276 KPA, (iv) wherein the light source comprises an excitation laser, a UV LED, a high intensity discharge lamp, or a solar source, and/or (v) wherein the chamber has a temperature of 24 to 80° C.

4. The method of claim 3, wherein the light source is an excitation laser, wherein the excitation laser has a wavelength from 380 nm to 750 nm, and wherein the excitation laser has a power from 4 mW to 500 mW.

5. The method of any of claim 1, wherein the produced carbon structures primarily composes graphitic carbon.

6. The method of claim 1, wherein the heterogeneous catalyst further comprises at least partially boron-rich solids consisting of low dimensionality non-equilibrium carbon.

7. The method of any of claim 1, wherein the light source comprises an excitation laser, a UV LED, a high intensity discharge lamp, or a solar source.

8. The method of claim 1, wherein the hydrocarbon source is selected from a group comprising of methane, ethane, propene, allene, propyne, cyclohexene, and other hydrocarbons.

9. The method of claim 1 wherein the heterogeneous catalyst further comprises at least partially boron-rich solids consisting of low dimensionality non-equilibrium carbon.

10. The method of claim 1, wherein the hexagonal boron nitride has at least one catalytically active defect on a surface thereof.

11. The method of claim 1, wherein the solar irradiation is focused by a focusing element such as a conventional lens, a Fresnel lens, parabolic mirrors, a mirror array, or a lens array.

12. The method of claim 1, wherein the solar irradiation is focused to a spot with an area of 1 cm$^2$ to 4 cm$^2$.

13. The method of claim 1, wherein the solar irradiation is focused to a spot to produce an irradiance of 5 to 20 W/cm$^2$.

* * * * *